(12) United States Patent
Santo et al.

(10) Patent No.: US 6,587,284 B2
(45) Date of Patent: Jul. 1, 2003

(54) OBJECTIVE LENS DRIVING APPARATUS

(75) Inventors: Takeo Santo, Neyagawa (JP); Masanari Mohri, Hyogo (JP); Hiroshi Yamamoto, Kyoto (JP); Kanji Wakabayashi, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/967,078

(22) Filed: Sep. 28, 2001

(65) Prior Publication Data

US 2002/0075575 A1 Jun. 20, 2002

Related U.S. Application Data

(63) Continuation of application No. 09/672,847, filed on Sep. 28, 2000, now Pat. No. 6,344,936.

(30) Foreign Application Priority Data

Sep. 29, 1999 (JP) .......................................... 11-276815

(51) Int. Cl.[7] ................................................ G02B 7/02
(52) U.S. Cl. ...................................... 359/824; 359/814
(58) Field of Search ................................ 359/824, 814; 369/44.14, 44.15, 44.16

(56) References Cited

U.S. PATENT DOCUMENTS

| | | | |
|---|---|---|---|
| 5,285,434 A | 2/1994 | Kim et al. | 369/44.14 |
| 5,321,678 A | 6/1994 | Takishima et al. | 369/44.14 |
| 5,359,459 A | 10/1994 | Kim | 359/824 |
| 5,561,646 A | 10/1996 | Shtipelman et al. | 369/44.14 |
| 5,905,255 A * | 5/1999 | Wakabayashi et al. | 250/201.5 |
| 5,949,590 A | 9/1999 | Hong | 359/814 |
| 6,278,669 B1 * | 8/2001 | Anzai et al. | 369/44.14 |

FOREIGN PATENT DOCUMENTS

| | | |
|---|---|---|
| JP | 62-219240 A | 9/1987 |
| JP | 5-101427 A | 4/1993 |
| JP | 8-203103 A | 8/1996 |

* cited by examiner

Primary Examiner—Ricky Mack
(74) Attorney, Agent, or Firm—Pearne & Gordon LLP

(57) ABSTRACT

An objective lens driving apparatus is improved in a tracking drive sensitivity, and is capable of suppressing the occurrence of a tilt when a moving member is driven for tracking and focusing motions. To achieve this, the objective lens driving apparatus comprises: a substantially rectangularly shaped focusing coil and a substantially rectangularly shaped tracking coil, both arranged in the same plane, and fixed to a lens holder to drive the lens holder on which an objective lens is held; and a magnet having mutually opposite magnetic poles arranged at positions opposite winding portions of the focusing coil which lie on two sides thereof extending perpendicularly to a focusing direction, and also having mutually opposite magnetic poles arranged at positions opposite winding portions of the tracking coil which lie on two sides thereof extending perpendicularly to a tracking direction.

12 Claims, 16 Drawing Sheets

OBJECTIVE LENS DRIVING APPARATUS

This application is a Continuation of 09/672,847, filed Sep. 28, 2000 now U.S. Pat. No. 6,344,936.

BACKGROUND OF THE INVENTION

The present invention relates to an objective lens driving apparatus, and more particularly to an objective lens driving apparatus provided in an apparatus for optically recording and reproducing information by a light spot irradiated on a disc-shaped recording medium.

An objective lens driving apparatus is used in an optical disc drive which records and reproduces information represented by sequence of pits by irradiating a light beam spot on a disc-shaped information recording medium (hereinafter is referred to as disc) such as a compact disc. The objective lens driving apparatus drives an objective lens so that the light beam spot is accurately applied to a predetermined position on the disc. A focusing error and a tracking error ordinarily arise between the pit sequence on the rotating disc and the light beam spot. The focusing error is caused by vibration of a disc face in the axial direction (hereinafter is referred to as face vibration) and the tracking error is caused by eccentricity of the disc. To correct these errors, the objective lens driving apparatus controls the objective lens in a direction perpendicular to the disc face (hereinafter is referred to as focusing direction) as well as in the radial direction of the disc (hereinafter is referred to as tracking direction) so that an adequately focused light beam spot continues to trace accurately the pit sequence.

In CD-ROM drives, DVD-ROM drives, etc. used with personal computers, the increase of a data transfer speed is required with the improvement of processing performance of the computer. To increase the data transfer speed, it has been practiced to increase the disc rotational speed, thereby realizing a high speed recording and reproducing operation. However, with the increase of the disc rotational speed, the objective lens is required to be controlled at higher speeds to follow with vibrations caused by the face vibration varying at a high speed and disc eccentricity. In order to reply to the above-mentioned demand, a high acceleration sensitivity is required in the objective lens driving apparatus. The acceleration sensitivity is defined as the ratio of a current supplied to the objective lens driving apparatus to an acceleration when the objective lens moves. It is known that the acceleration sensitivity required to the objective lens driving apparatus increases with the square of the revolution speed of the disc.

In order to increase the acceleration sensitivity in the objective lens driving apparatus, the moving member on which the objective lens is mounted has been reduced in weight, and improvements are made in the magnetic circuit used to generate the driving force. A prior art objective lens driving apparatus will be described below with reference to drawings.

FIG. 12 is a perspective view of relevant parts of the prior art objective lens driving apparatus.

In FIG. 12, an objective lens 101 and a printed coil board 104 are rigidly fixed to a lens holder 102 to construct a moving member 100. Suspension wires 103a, 103b, and 103c, and a suspension wire 103d located below the suspension wire 103c and hidden from view in the drawing, are each fastened at one end to the lens holder 102 and at the other end to a wire holder 111. The wire holder 111 is fixed to a base 110. Two yoke bases 107a and 107b are mounted on the base 110 in opposed relationship. Magnets 108a and 108b are mounted on the opposing surfaces of the yoke bases 107a and 107b, respectively, thereby forming a magnetic circuit. The printed coil board 104 is located between the magnets 108a and 108b.

FIG. 13 is a plan view of the printed coil board 104 and the magnets 108a and 108b, as seen in the direction of arrow V in FIG. 12. In FIG. 13, one focusing coil 105 and four tracking coils 116 to 119 are mounted on the printed coil board 104. Arrow Fo in the figures indicates the moving direction of the printed coil board 104 for focusing action (hereinafter is referred to as the focusing direction), and arrow Tk indicates the moving direction of the same for tracking action (hereinafter is referred to as tracking direction).

In FIG. 13, the focusing coil 105 substantially rectangular in shape is located in the central portion of the printed coil board 104. A current flows through the focusing coil 105 in the direction shown by arrow If (hereinafter is referred to as current If). Two tracking coils 116 and 117 substantially rectangular in shape are located at the left side of the focusing coil 105, and two tracking coils 118 and 119 substantially rectangular in shape are located at the right side thereof. The four tracking coils 116 to 119 are wired so that a current flows in the direction indicated by arrow It (hereinafter is referred to as current It). The printed coil board 104 includes one layer or a plurality of layers. When the printed coil board 104 includes a plurality of layers, the focusing coil 105 and the tracking coils 116 to 119 are respectively wired so that the current flows in the same direction in any of the coils on the respective layers.

In FIG. 12 and FIG. 13, the dimensions of the magnets 108a and 108b are determined so that their left and right sides align with the centers of the left-side tracking coils 116, 117 and the right-side tracking coils 118, 119, respectively. The vertical dimension of each of the magnets 108a and 108b is made larger than the vertical dimension of any of the focusing coil 105 and the tracking coils 116 to 119. The magnets 108a and 108b are magnetized so that each magnet has one magnetic pole (for example, N pole) on the surface thereof facing to the printed coil board 104 and the opposite magnetic pole (for example, S pole) on the opposite surface thereof. In FIG. 13, on the upper half sections of the magnets 108a and 108b sectioned by a magnetization boundary line MB of a horizontal dashed line; the magnetic lines of forces are directed from a viewer of the figure into behind the paper face of the figure, and in the lower half section, the magnetic lines of forces are directed from behind the paper face of the figure toward the viewer. The magnetization boundary line MB indicates that the magnetization state is reversed across the boundary line. The magnets 108a and 108b are magnetized so that the opposite magnetic poles face each other with the printed coil board 104 interposed therebetween.

When the current If flows through the focusing coil 105, winding portions 105a of the focusing coil 105 on two sides perpendicular to the focusing direction Fo receive an electromagnetic force in the focusing direction Fo in accordance with Fleming's rules. As a result, the moving member 100 is driven in the focusing direction Fo. In winding portions 116a to 119a and 116b to 119b of the tracking coils 116 to 119 on respective two sides perpendicular to the tracking direction Tk, the winding portions 116b to 119b on the sides nearer to the focusing coil 105 are located within the magnetic field of the magnets 108a and 108b. When the current It flows through the tracking coils 116 to 119, the winding portions 116b to 119b receive the electromagnetic force in the tracking direction Tk in accordance with Fleming's rules, and the moving member 100 is driven in the tracking direction. Improvements are intended for focusing drive sensitivity and tracking drive sensitivity by placing the printed coil board 104 within the magnetic field of high magnetic flux density formed by the two opposing magnets 108a and 108b. Where, the focusing drive sensitivity is defined as the ratio (LF/If) of a moving distance LF of the moving member 100 in the focusing direction Fo to the current If flowing through the focusing coil 105, and the tracking drive sensitivity is defined as the ratio (LT/It) of a moving distance LT of the moving member 100 in the tracking direction Tk to the current It flowing through the tracking coils 116 to 119.

In the above-mentioned configuration, in the focusing coil 105, the winding portions 105a on two of the four sides generate the driving force in the focusing direction Fo. In the tracking coils 116 to 119, on the other hand, only the winding portions 116b to 119b on one side of each tracking coil generate the driving force in the tracking direction Tk. As a result, the tracking drive sensitivity is lower than the focusing drive sensitivity, resulting in the problem that the moving member 100 cannot achieve a sufficient acceleration sensitivity necessary for high speed record and reproduction. Where, the acceleration sensitivity is defined as the ratio, $\alpha/It$ or $\alpha/If$, of the acceleration $\alpha$ when the moving member 100 moves in the tracking direction or focusing direction to the current I. Another problem is that a tilt occurs in the moving member 106 because of the influence of moments associated with those portions (hereinafter is referred to as ineffective portions) of the tracking coils 116 to 119 which do not contribute to the generation of the driving force in the tracking direction Tk. This tilt problem will be described with reference to FIG. 14A and FIG. 14B.

FIG. 14A and FIG. 14B are plan views of the printed coil board 104 and the magnets 108a and 108b, as seen in the direction of arrow V in FIG. 12. In the figures, oblique hatching indicates the ineffective portions 116c, 117c, 118c, 119c, 116d, 117d, 118d, and 119d on two sides perpendicular to the focusing direction Fo, of the respective tracking coils 116 to 119 placed within the magnetic field of the magnets 108a and 108b. The moments about the center point O of the printed coil board 104, caused by the electromagnetic forces in the focusing direction Fo acting on the ineffective portions 116c to 119c and 116d to 119d, are indicated by arrows N1 and N2.

FIG. 14A shows the condition in which the current It flows through the tracking coils 116 to 119 and the printed coil board 104 is caused to move relative to the magnet 108a by a distance X in the tracking direction Tk. For simplicity, it is provided that the respective area-ratios between the ineffective portions 116c, 117c, 116d, 117d and the ineffective portions 118c, 119c, 118d, 119d are 2:1. It is also provided that the electromagnetic force acting points of any two ineffective portions positioned symmetrically about the center point O are located at approximately equal distances from the center point O. In the figure, the factor attached to letter "e" indicates the magnitude of the electromagnetic force, and the arrow alongside it indicates the direction of the electromagnetic force. In the tracking coil 116, the upper and lower ineffective portions 116c and 116d receive electromagnetic forces 2e equal in magnitude but opposite in direction, and therefore the electromagnetic forces are cancelled. In the tracking coil 117 also, the upper and lower ineffective portions 117c and 117d receive electromagnetic forces 2e equal in magnitude but opposite in direction, and therefore the electromagnetic forces are cancelled. Likewise, in the tracking coils 118 and 119, the respective ineffective portions 118c and 118d or 119c and 119d receive electromagnetic forces e equal in magnitude but opposite in direction, and therefore the electromagnetic forces are cancelled. As a result, the clockwise moment N1 and counterclockwise moment N2 about the center point O become equal to each other, and the difference N between is zero.

Description is made as to the case where the printed coil board 104 is caused to move by the distance X in the tracking direction Tk and, at the same time, is caused to move by a distance Y in the focusing direction Fo by the application of the focusing current If, as shown in FIG. 14B. In this case, differences occur in the density of the magnetic flux passing through the ineffective portions 116c to 119c and 116d to 119d of the respective tracking coils 116 to 119. The reason is that, when viewed along the focusing direction Fo, the magnetic flux density of the magnetic field formed by the magnets 108a and 108b has a nonuniform distribution such that the flux density is highest near the center CP (indicated by semi-dashed line) of each magnetic pole and lowest near the magnetization boundary line ML indicated by dashed line and also near the edge E.

The case that the printed coil board 104 is moved as illustrated in FIG. 14B will be described by using specific numerical values. The ineffective portions 116c and 118c of the tracking coils 116 and 118 move closer to the edge E where the magnetic flux density of the magnets 108a and 108b is low. Assume that the electromagnetic forces have therefore decreased by 20% to 1.6e and 0.8e, respectively. On the other hand, the ineffective portions 116d and 118d of the tracking coils 116 and 118 move closer to the center CP where the magnetic flux density of the magnets 108a and 108b is high. Assume that the electromagnetic forces have therefore increased by 20% to 2.4e and 1.2e, respectively. Further, the ineffective portions 117c and 119c of the tracking coils 117 and 119 move closer to the magnetization boundary line ML where the magnetic flux density of the magnets 108a and 108b is low. Assume that the electromagnetic forces have therefore decreased by 20% to 1.6e and 0.8e, respectively. On the other hand, the ineffective portions 117d and 119d of the tracking coils 117 and 119 move closer to the center CP where the magnetic flux density of the magnets 108a and 108b is high. Assume that the electro magnetic forces have therefore increased by 20% to 2.4e and 1.2e, respectively. As a result, the difference between the clockwise moment N1 and counterclockwise moment N2 about the center point O is N1−N2=−2.4e. Therefore a counterclockwise moment N arises on the printed coil board 104. This moment N causes the moving member 100 to tilt in the radial direction (hereinafter is referred to as radial tilt). There is a problem that this radial tilt causes an aberration in the light beam spot focused on the recording face of the disc, adversely affecting the correct record and reproduction of signals.

BRIEF SUMMARY OF THE INVENTION

An object of the present invention is to solve the above-mentioned problem associated with the prior art and to provide an objective lens driving apparatus having high driving sensitivities and capable of suppressing the occurrence of the radial tilt in the moving member.

An objective lens driving apparatus of the present invention comprises: an objective lens for focusing a light beam onto a recording face of a disc for recording and reproducing information on the disc; a lens holder for holding thereon the objective lens; a supporting member for supporting the lens holder so as to be movable in a focusing direction of an optical axis direction of the objective lens, and also in a tracking direction of a radial direction of the disc; a coil assembly attached to the lens holder, the coil assembly including a focusing coil and a tracking coil, each coil having a coiling axis oriented perpendicularly to a plane containing the focusing direction and the tracking direction; and a magnet assembly disposed opposite to the coil assembly, the magnet assembly including a first magnet, whose magnetic poles face to winding portions of the focusing coil receiving an electromagnetic force in the focusing direction (Fo) when a current flows through the coil assembly, and a second magnet, whose magnetic poles face to winding portions of the tracking coil receiving an electromagnetic force in the tracking direction.

According to the present invention, since the magnetic poles of the magnets face to all the winding portions on those sides of each tracking coil which are effective to produce a driving force, the driving force increases and a high driving sensitivity can be obtained in comparison with the prior art in which only a part of effective sides of each tracking coil faces to the magnetic pole. Furthermore, moments about the center of the focusing coil, caused by the electromagnetic forces acting on the winding portions on the sides of the tracking coils perpendicular to the focusing direction, i.e., the ineffective portions that do not contribute to the generation of the driving force are cancelled, thereby preventing the moving member from tilting in the radial direction of the disc, and making stable signal recording and reproducing operation under a high speed driving conditions.

An objective lens driving apparatus in another aspect of the present invention comprises: an objective lens for focusing a light beam onto a recording face of a disc for recording and reproducing information on the disc; a lens holder for holding thereon the objective lens; a supporting member for supporting the lens holder so as to be movable in a focusing direction of an optical axis direction of the objective lens, and also in a tracking direction of a radial direction of the disc; a coil assembly having a board attached to the lens holder, the coil assembly including a focusing coil formed in a center portion of the board and at least two tracking coils formed on both sides of the focusing coil on the board, wherein the tracking coils are arranged symmetrically to each other with respect to a center line extending across the focusing coil in parallel to the tracking direction and are aligned in a direction normal to the center line; and a magnet assembly including: a first magnet, which is disposed opposite to the focusing coil, and whose edge portion extending parallel to the focusing direction passes through the centers of the tracking coils so as to face to one-half region of each of the tracking coils, the first magnet having magnetic poles facing to winding portions of the focusing coil which extend in a direction intersecting the focusing direction; and a second magnet, which is disposed so as to face to the remaining one-half region of each of the tracking coils, and whose magnetic poles face to winding portions of the tracking coils which extend in a direction intersecting the tracking direction.

According to the invention of this aspect, the magnet poles opposite to the focusing coil and the tracking coils, all the coils being arranged in the same plane and substantially rectangular in shape, are magnetized so that their magnetic poles are formed at all the positions corresponding to those winding portions of the focusing coil and tracking coils which contribute to the generation of the driving forces in the respective driving directions. This serves to increase the driving sensitivities, increasing the tracking capability of the objective lens and making high speed recording and reproducing possible. Furthermore, the moments about the center point O of the printed coil board 4a, caused by the electromagnetic forces acting on the winding portions on the sides of the tracking coils extending perpendicularly to the focusing direction, i.e., the ineffective portions that do not contribute to the generation of the driving force, cancel each other, serving to suppress a radial tilt of the moving member. This makes stable recording and reproducing possible under high speed driving conditions. Moreover, by arranging a plurality of focusing coils in the tracking direction and changing the direction or the value of the current to be supplied to some of a plurality of focusing coils, it becomes possible to control the radial tilt.

An objective lens driving apparatus in another aspect of the present invention comprises: an objective lens for focusing a light beam on a disc for recording and reproducing information on said disc; a lens holder for holding said objective lens a supporting member for supporting said lens holder so as to be movable in a focusing direction along the optical axis of said objective lens, and in a tracking direction of a radial direction of said disc; a coil assembly formed on a board attached to said lens holder, said coil assembly including a focusing coil asymmetric with respect to a center line of said board in parallel to said focusing direction, and a tracking coil asymmetric with respect to said center line; and a magnet assembly including a first magnet having on a surface thereof two magnetic poles disposed opposite to said focusing coil, and a second magnet disposed adjacent to said first magnet on the same plane as said first magnet and having a boundary with said first magnet passing the centers of said tracking coils in the focusing direction.

According to the invention of this aspect, since the driving force is exerted on all the winding portions of two sides of each tracking coil, the acceleration sensitivity increases. As a result, the focusing and track-following ability of the objective lens increases, and high speed recording and reproducing operation is achieved. The moments about the center point, caused by the electromagnetic forces acting on the ineffective portions, i.e., the winding portions on the sides of the tracking coils perpendicular to the focusing direction, are cancelled with each other, serving to suppress the radial tilt of the moving member. Consequently, stable recording and reproducing operation is realizable under high speed driving. Since the focusing coil is asymmetric with respect to the center line, the focusing coil can be made so as to be longer in the tracking direction Tk. The area of the effective winding portions perpendicular to the focusing direction increases, and the area of the ineffective portions perpendicular to the tracking direction decreases. The proportion of the effective portions in the entire focusing coil increases.

DETAILED DESCRIPTION OF THE INVENTION

Figure 1:
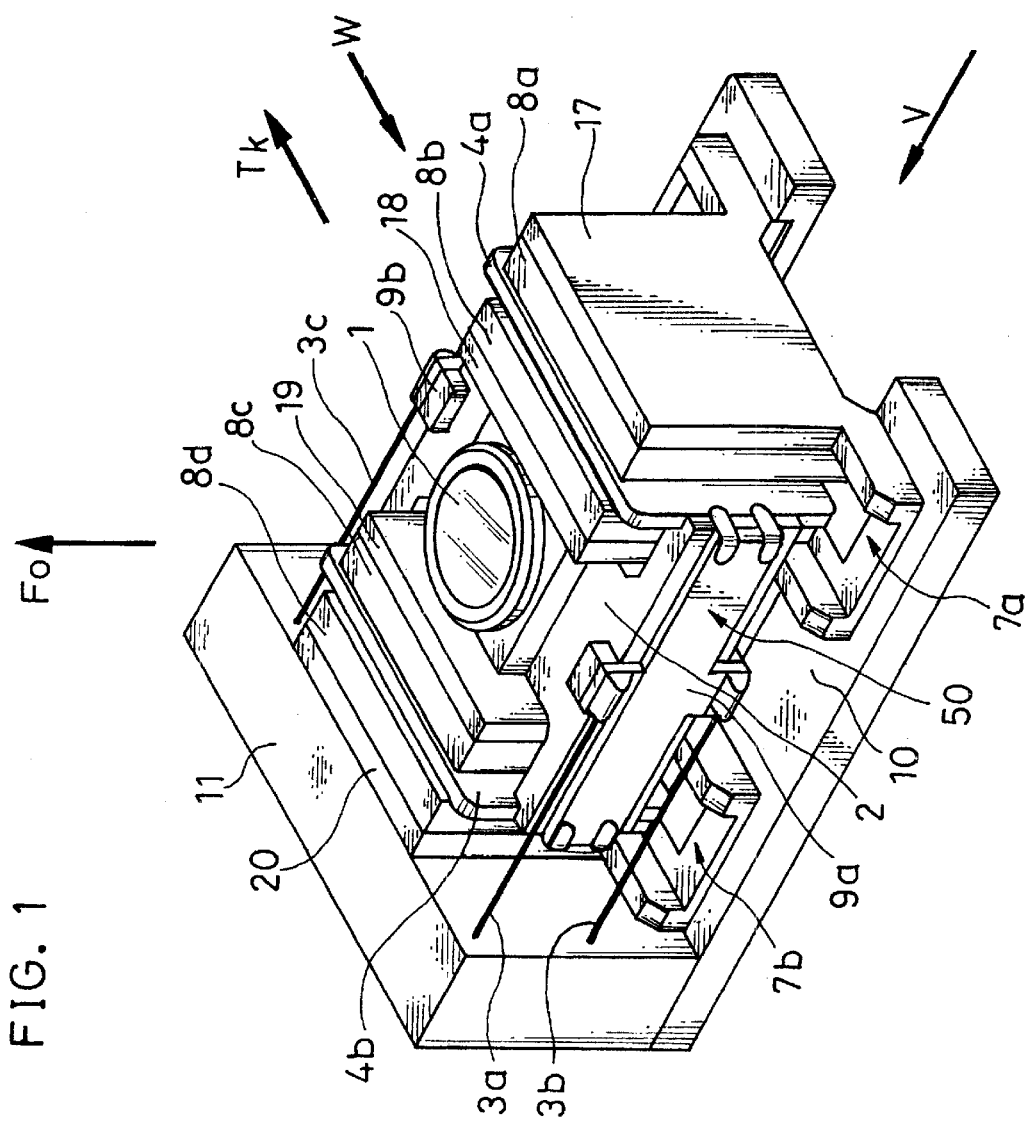
FIG. 1 is a perspective view of the relevant parts of an objective lens driving apparatus according to a first embodiment of the present invention.

The preferred embodiments of the present invention will be described below with reference to FIG. 1 to FIG. 11B. Throughout the figures, the same elements are designated by the same reference characters.

First Embodiment

Figure 2A:
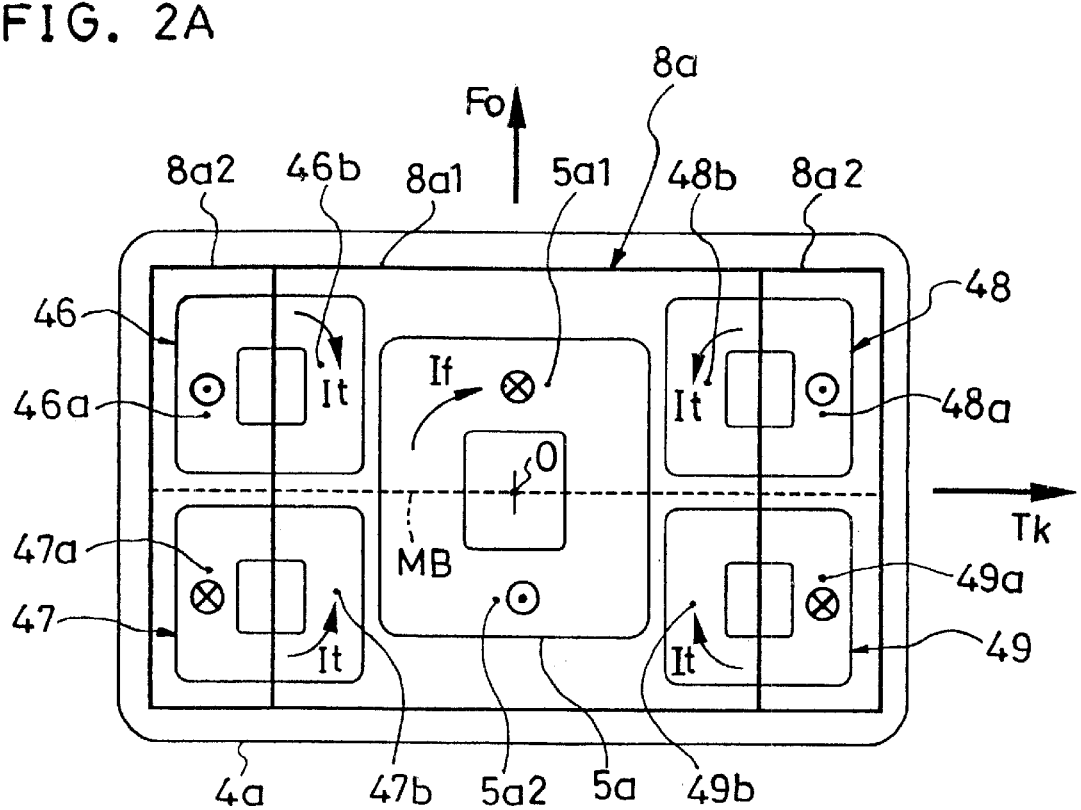
FIG. 2A is a plan view as seen from the direction of arrow V in FIG. 1, showing the positional relationship between a printed coil board 4a and a magnet 8a in the objective lens driving apparatus of the first embodiment.
Figure 2B:
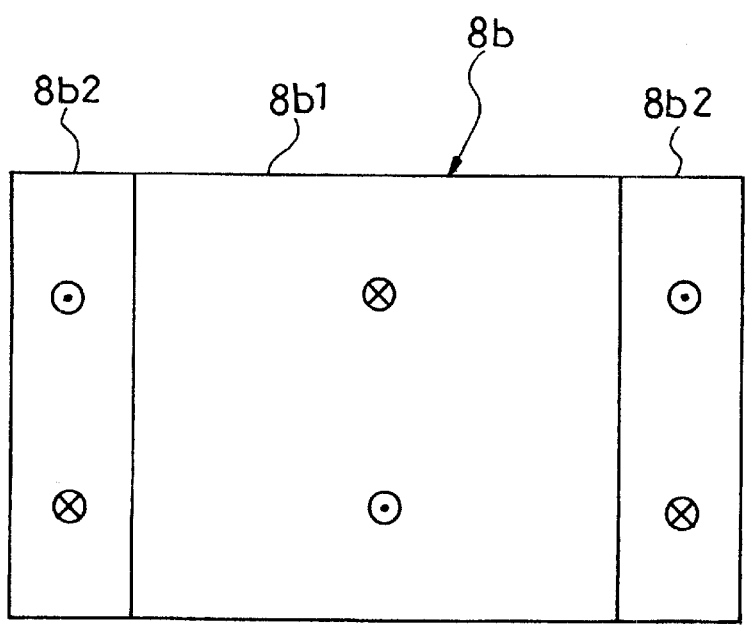
FIG. 2B is a plan view of a magnet 8b.
Figure 3A:
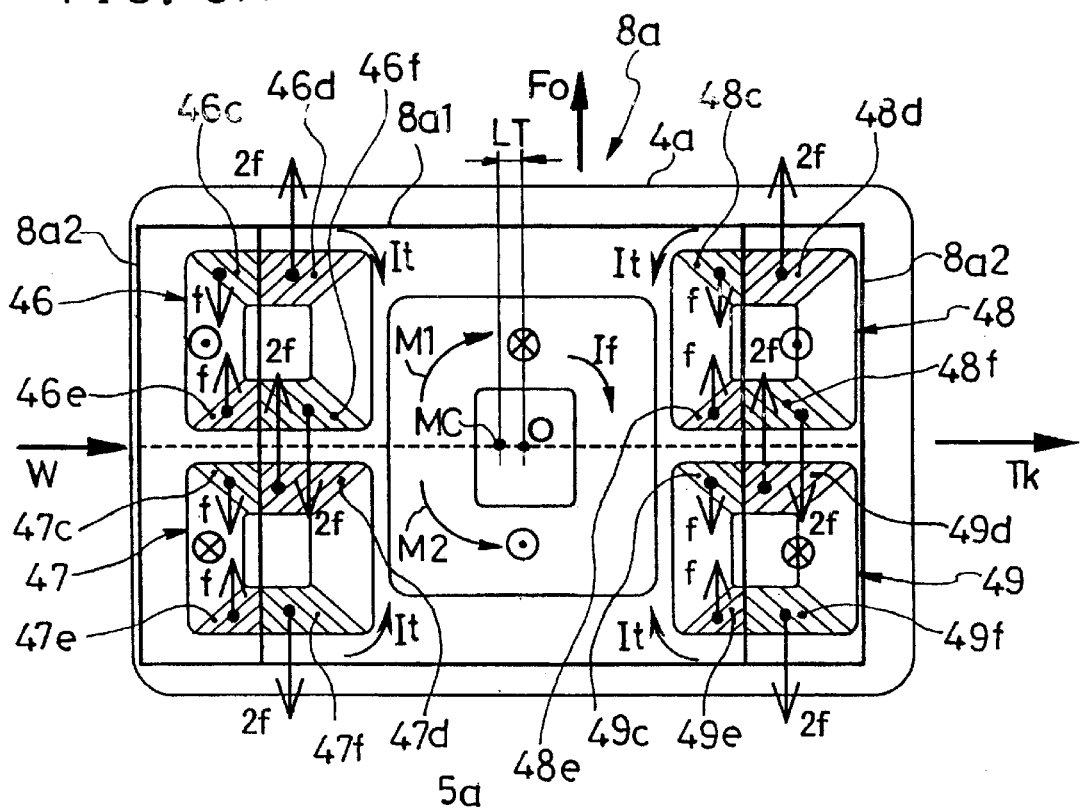
FIG. 3A is a plan view showing the positional relationship between the printed coil board 4a and the magnet 8a when the objective lens driving apparatus of the first embodiment is driven for tracking motion.
Figure 3B:
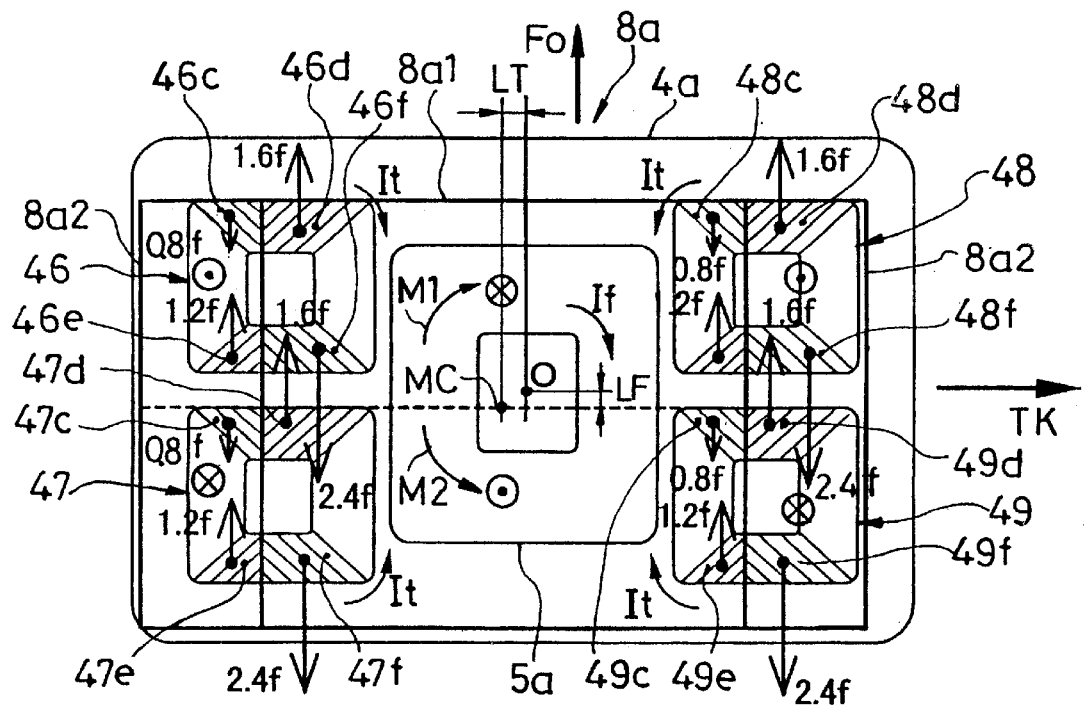
FIG. 3B is a plan view showing the positional relationship between the printed coil board 4a and the magnet 8a when the objective lens driving apparatus of the first embodiment is driven for tracking and focusing motions.
Figure 4:
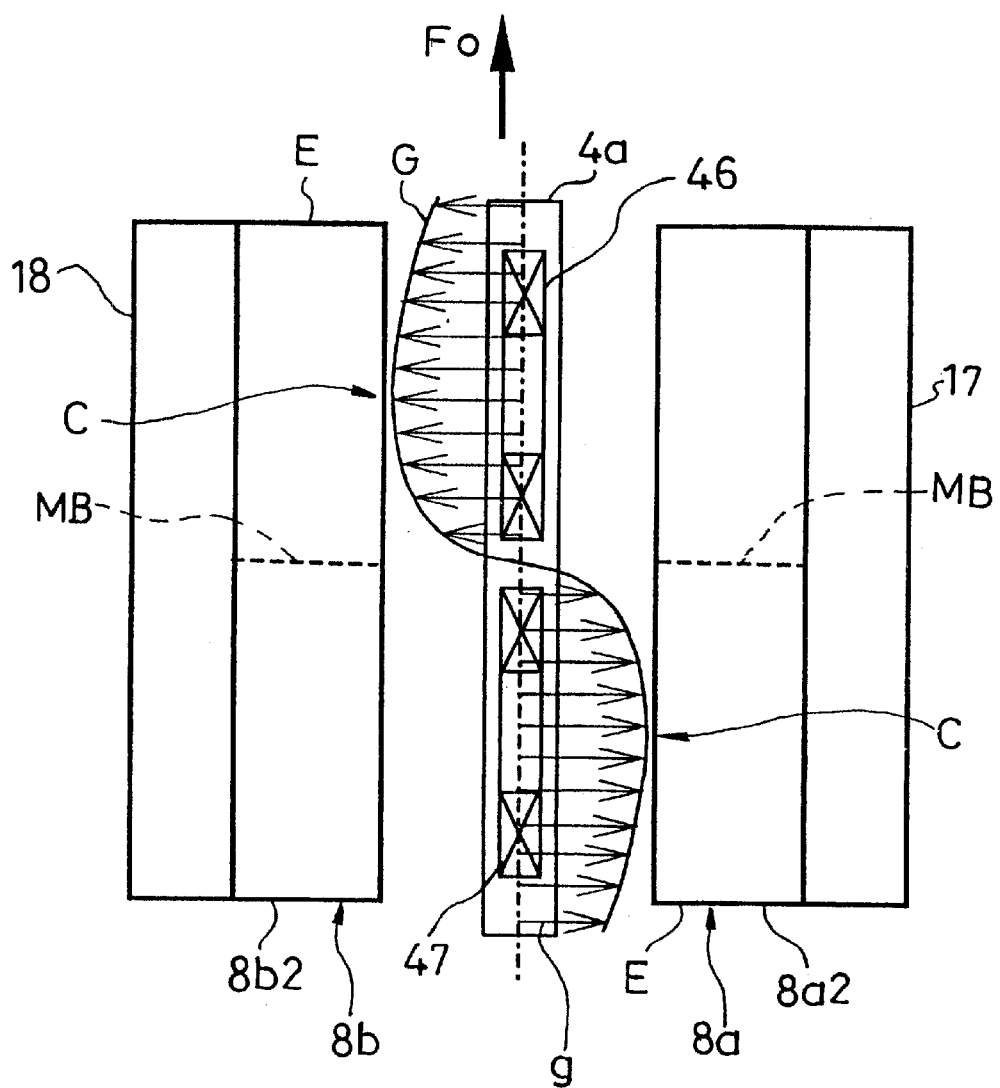
FIG. 4 is a side view showing the distribution of magnetic flux density between the magnets 8a and 8b in the objective lens driving apparatus of the first embodiment.
Figure 5A:
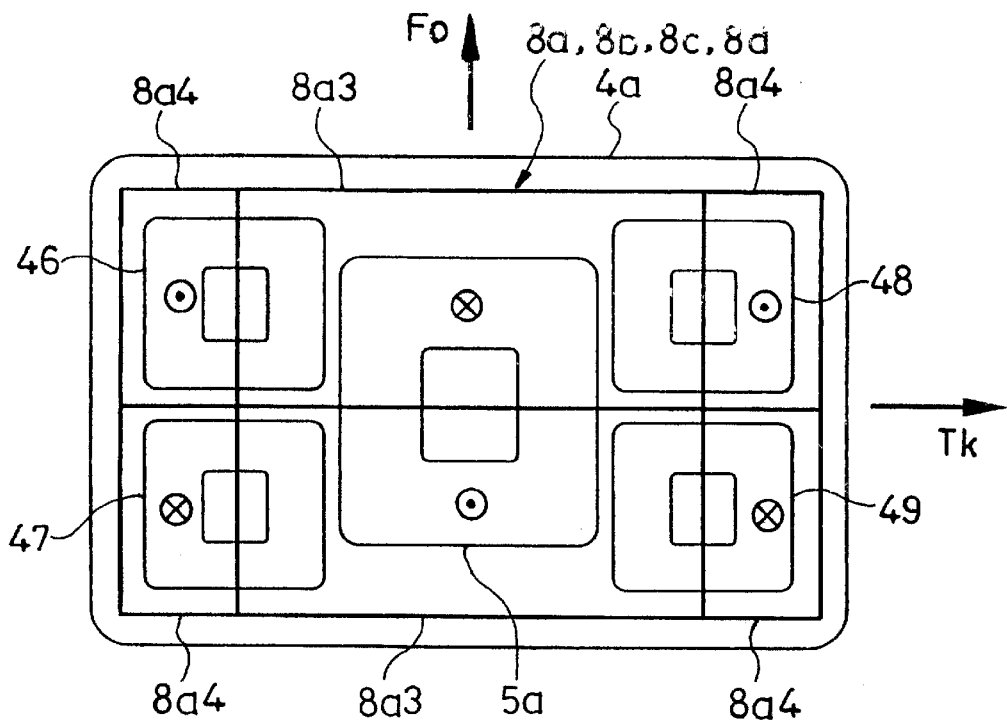
FIG. 5A is a plan view showing another configuration example of the magnets in the objective lens driving apparatus of the first embodiment, including the printed coil board.
Figure 5B:
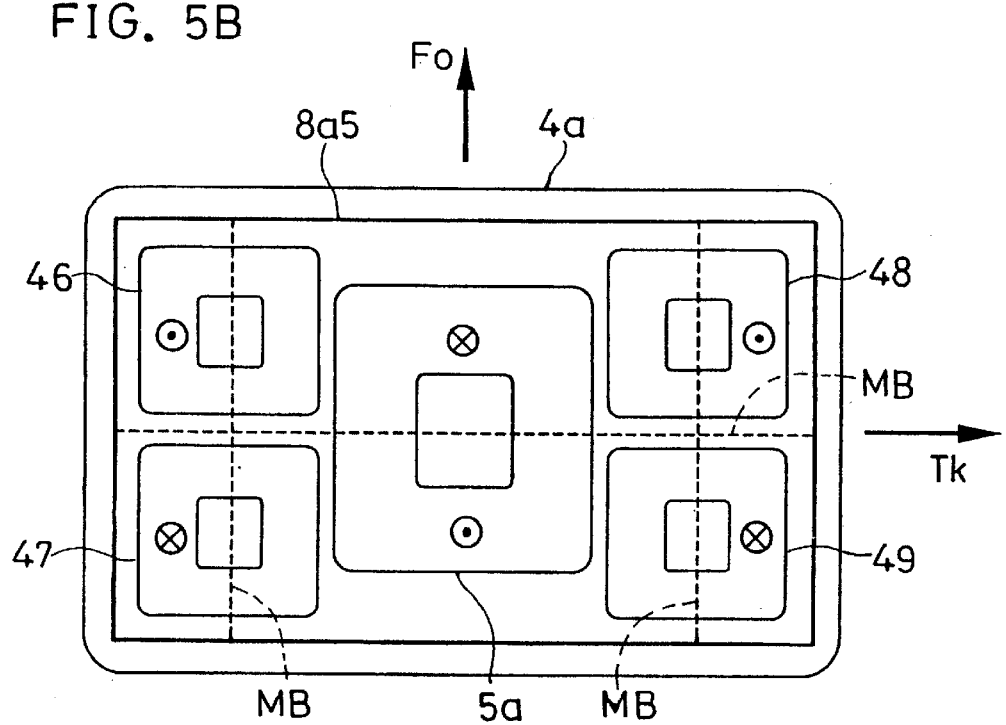
FIG. 5B is a plan view showing still another configuration example of the magnets in the objective lens driving apparatus of the first embodiment, including the printed coil board.

FIG. 1 is a perspective view showing the relevant parts of an objective lens driving apparatus according to a first embodiment of the present invention. FIG. 2A is a plan view showing a printed coil board 4a and a magnet 8a in the objective lens driving apparatus of the first embodiment, as seen from the direction of arrow V in FIG. 1. FIG. 2B is a plan view of a magnet 8b. FIG. 3A and FIG. 3B are plan views of the printed coil board 4a and the magnet 8a, illustrating the operation of the objective lens driving apparatus of the first embodiment. FIG. 4 is a side view as seen from the direction of arrow W in FIG. 1, showing the magnetic flux density between the magnets 8a and 8b in the objective lens driving apparatus of the first embodiment. FIG. 5A and FIG. 5B are plan views showing alternative configuration examples of the magnet 8a in the objective lens driving apparatus of the first embodiment.

In FIG. 1, an objective lens 1, printed coil boards 4a and 4b, and interconnecting printed boards 9a and 9b are rigidly fixed to a lens holder 2 to construct a moving member 50. The printed coil boards 4a and 4b are electrically interconnected via the interconnecting printed boards 9a and 9b. Coils arranged on the printed coil boards 4a and 4b, described in detail later, are connected to a driving circuit (not shown) via the interconnecting printed boards 9a and 9b and via suspension wires 3a, 3b, 3c, and 3d, the suspension wire 3d being located below the suspension wire 3c and can not be seen in FIG. 1. The moving member 50 is suspended by the suspension wires 3a to 3d, and drive currents for driving the moving member 50 are supplied to the coils through the suspension wires 3a to 3d. The suspension wires 3a, 3b, 3c, and 3d are each fastened at one end to the interconnecting printed board 9a or 9b and at the other end to a wire holder 11. The wire holder 11 is fixed to a base 10. Yoke bases 7a and 7b are fixedly mounted on the base 10, each substantially vertical relative to the plane of the base 10 and spaced apart from the other by a prescribed distance. The yoke base 7a has two yoke base plates 17 and 18 facing each other with a predetermined spacing provided therebetween. Plate-like magnets 8a and 8b are mounted on the inside surfaces of the yoke base plates 17 and 18, respectively. The yoke base 7b also has yoke base plates 19 and 20, substantially the same as those of the yoke base 7a, and magnets 8c and 8d are mounted on the inside faces of the yoke base plates 19 and 20, respectively. The objective lens 1 mounted on the moving member 50 is located between the yoke bases 7a and 7b. The printed coil board 4a in the moving member 50 is inserted between the magnets 8a and 8b, and the printed coil board 4b is inserted between the magnets 8c and 8d.

FIG. 2A is a plan view of the printed coil board 4a and the magnet 8a, as seen in the direction perpendicular to the printed coil board 4a (in the direction of arrow V in FIG. 1). In FIG. 1 and FIG. 2, the direction along which the moving member 50 moves for focusing action is indicated by arrow Fo, and hereinafter is referred to as focusing direction Fo. Likewise, the direction along which the moving member 50 moves for tracking action is indicated by arrow Tk, and hereinafter is referred to as tracking direction Tk. In FIG. 2, a focusing coil 5a substantially rectangular in shape has a coil axis oriented perpendicularly to the plane containing the focusing direction Fo and the tracking direction Tk, and is disposed in the central portion of the printed coil board 4a.

Two tracking coils 46 and 47 having similar coil axes and substantially rectangular in shape are arranged vertically on the left side of the focusing coil 5a. Similarly, two tracking coils 48 and 49 substantially rectangular in shape are arranged vertically on the right side of the focusing coil 5a. The focusing coil 5a and the tracking coils 46 to 49 need not necessarily be rectangular in shape, but may be circular or polygonal in shape. The focusing coil 5a and the tracking coils 46 to 49 are integrally formed on the printed coil board 4a. The four tracking coils 46 to 49 are connected in series so that the current for tracking motion flows through each coil in the direction indicated by arrow It in FIG. 2 (hereinafter is referred to as tracking current It). The printed coil board 4a is formed from one layer or a plurality of layers; when the printed coil board 4a is formed from a plurality of layers, the focusing coils 5a and the tracking coils 46 to 49 are respectively connected in series between the respective layers so that the current flows in the same direction in any of the coils on the layers.

The magnet 8a is constructed from an assembly of three two-pole magnetized magnets 8a1, 8a2, and 8a2, each having one magnetic pole (for example, N pole) in a portion of the surface thereof facing the printed coil board 4a and the opposite magnetic pole (for example, S pole) in another portion thereof. The horizontal dimension of the magnet 8a is made larger than that of the region containing the focusing coil 5a and tracking coils 46 to 49. The magnetic poles of the magnet 8a1 are arranged so that the magnetic flux density becomes larger at winding portions 5a1 and 5a2 of two sides of the focusing coil 5a which are perpendicular to the focusing direction Fo. The magnetic poles of the magnets 8a2 are arranged so that the magnetic flux density becomes larger at winding portions 46a to 49a of the tracking coils 46 to 49, which winding portions 46a to 49a are respectively perpendicular to the tracking direction Tk. When the printed coil board 4a is in its initial position, a left boundary between the magnets 8a1 and 8a2 passes the centers of the tracking coils 46 and 47 and a right boundary between the magnets 8a1 and 8a2 passes the centers of the tracking coils 48 and 49.

The respective winding portions 46a and 47a of the tracking coils 46 and 47, which portions being located on the sides perpendicular to the tracking direction Tk, face to the magnetic poles of the magnet 8a2. The winding portions 46b and 47b face to the magnetic poles of the magnet 8a1. The relationships between the tracking coils 48, 49 and the magnets 8a1, 8a2 are similar to the above. The magnet 8b shown in FIG. 1 is constructed from an assembly of three two-pole magnetized magnets 8b1, 8b2, and 8b2, as shown in FIG. 2B. The magnets 8b1, 8b2 have magnetic poles on the surface facing to the printed coil board 4a, and the magnetic poles of the magnet 8b are opposite in polarity to the corresponding magnetic poles of the magnet 8a. The opposing magnetic poles of the magnets 8a and 8b enhance the density of the magnetic flux passing perpendicularly through the printed coil board 4a placed between the magnets 8a and 8b. The detailed constructions of the printed coil board 4b and magnets 8c and 8d shown in FIG. 1 are the same as those of the printed coil board 4a and magnets 8a and 8b described above, and therefore, the description will not be repeated here.

When a current in the direction indicated by arrow If (hereinafter is referred to as focusing current If) flows through the focusing coil 5a, the winding portions 5a1 and 5a2 on two sides perpendicular to the focusing direction Fo receive an electromagnetic force in the focusing direction Fo in accordance with Fleming's rules. As a result, the moving member 50 is driven in the focusing direction Fo. When the tracking current It flows through the tracking coils 46 to 49, the winding portions 46a to 49a and 46b and 49b, which are two sides perpendicular to the tracking direction Tk, receive an electromagnetic force in the tracking direction Tk, and the moving member 50 is driven in the tracking direction Tk. In the magnetic circuit configuration of FIG. 1, all of the winding portions 46a to 49a and 46b to 49b on the two sides of the tracking coils 46 to 49 contribute to the generation of the driving force. This serves to increase the acceleration sensitivity of the objective lens driving apparatus, increasing the focusing-following ability and track-following ability of the objective lens and making realizable a high speed record and reproduction.

Furthermore, in the objective lens driving apparatus of the first embodiment, the occurrence of the radial tilt in the moving member 50 is suppressed, as will be described below in detail. FIG. 3A and FIG. 3B are plan views of the printed coil board 4a and the magnet 8a, showing the moments on the moving member 50 due to the ineffective portions (hatched portions) of the tracking coils 46 to 49 which do not contribute to the generation of the tracking drive force. The electromagnetic force in the focusing direction Fo which is given to the winding portions (hatched portions) on two sides perpendicular to the focusing direction Fo is denoted by f or 2f in the tracking coils 46 to 49 placed within the magnetic field of the magnets 8a and 8b. The moments about the center point O of the printed coil board 4a, caused by the electromagnetic force f or 2f, are designated by arrows M1 and M2. FIG. 3A shows the condition in which the moving member 50 is moved by a distance LT in the tracking direction Tk by the tracking current It.

For simplicity, it is provided that the areas of the respective ineffective winding portions of the tracking coils 46 to 49 have changed as follows in the magnetic field of the magnets 8a and 8b. That is, the area ratio of each of the winding portions 46c, 46e, 47c, 47e to each of the winding portions 46d, 46f, 47d, 47f is 1:2. Likewise, the area ratio of each of the winding portions 48c, 48e, 49c, 49e to each of the winding portions 48d, 48f, 49d, 49f is 1:2. It is also provided that the electromagnetic force acting points of any two ineffective winding portions positioned symmetrically about the center point O are located at approximately equal distances from the center point O. In the tracking coils 46 to 49, the left-side winding portions 46c to 49c in the upper ineffective portions and the left-side winding portions 46e to 49e in the lower ineffective portions receive electromagnetic forces f equal in magnitude but opposite in direction with each other, and therefore the electromagnetic forces are cancelled. Likewise, in the tracking coils 46 to 49, the right-side winding portions 46d to 49d in the upper ineffective portions and the right-side winding portions 46f to 49f in the lower ineffective portions receive electromagnetic forces 2f equal in magnitude but opposite in direction, and therefore the electromagnetic forces are cancelled. As a result, the clockwise moment M1 and counterclockwise moment M2 about the center point O become equal in magnitude, and the resultant moment M is therefore zero.

FIG. 3B shows the condition in which the moving member 50 is moved by the distance LT in the tracking direction Tk and also moved by a distance LF in the focusing direction Fo by the application of the focusing current If. FIG. 4 is a side view as seen in the direction of arrow W in FIG. 3A, showing the distribution of the magnetic lines of force between the magnets 8a and 8b. In FIG. 4, each arrow g indicates the direction of a magnetic line, and the length of the arrow g represents the magnitude of the magnetic flux density. The envelope G of the arrows g shows the variation of a density of the magnetic flux passing through the printed coil board 4a. As shown by the envelope G, the strength of the magnetic field between the magnets 8a2 and 8b2 is not uniform, but becomes the largest near the center C of each magnetic pole and the smallest near the magnetization boundary line MB and also near the edge E. In the state of FIG. 3A in which the printed coil board 4a is not moved in the focusing direction Fo, the winding portions 46c to 49c and 46e to 49e of the tracking coils 46 to 49 are located in regions having approximately equal magnetic flux densities in the magnetic field. Likewise, the winding portions 46d to 49d and 46f to 49f are located in regions having approximately equal magnetic flux densities. Accordingly, the electromagnetic forces acting on the respective tracking coils 46 to 49 are equal in magnitude.

When the printed coil board 4a moves in the focusing direction Fo, as shown in FIG. 3B, the lower-side winding portions 46e to 49e and 46f to 49f of the tracking coils 46 to 49 move closer to the center C where the magnetic flux density is high. As a result, the electromagnetic forces acting on the winding portions 46e to 49e and 46f to 49f increase. On the other hand, since the winding portions 46c, 46d, 48c, and 48d of the tracking coils 46 and 48 move closer to the edge E where the magnetic flux density is low, the electromagnetic forces acting upon them decreases. Additionally, since the winding portions 47c, 47d, 49c, and 49d of the tracking coils 47 and 49 move closer to the magnetization boundary line MB, the electromagnetic forces acting on them decrease.

Figure 14A:
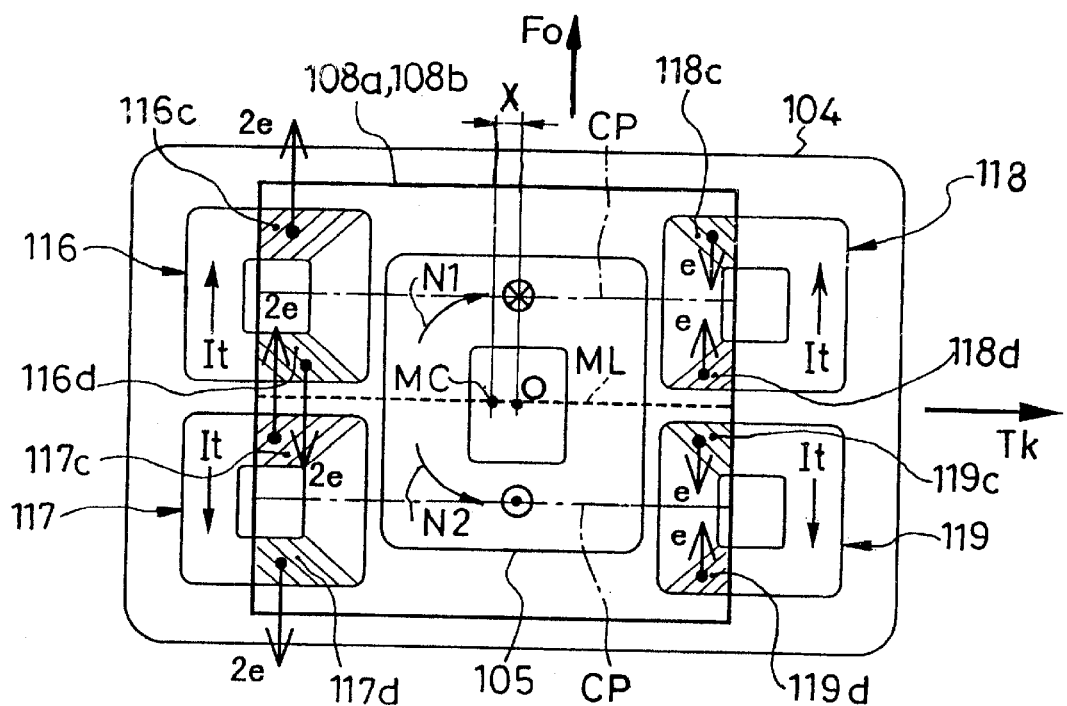
FIG. 14A is the plan view showing the printed coil and the magnet when the prior art objective lens driving apparatus is driven for tracking motion.
Figure 14B:
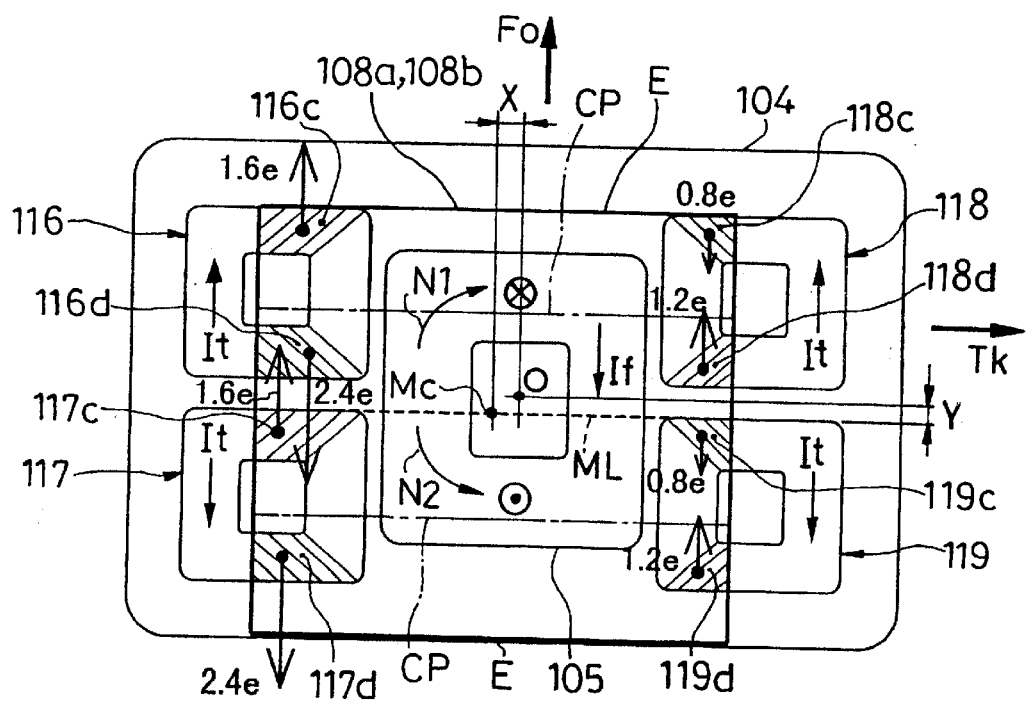
FIG. 14B is the plan view of the printed coil and the magnet when the prior art objective lens driving apparatus is driven for tracking and focusing motions.

For simplicity, in FIG. 3B it is provided that the density of the magnetic flux passing through any of the ineffective winding portions 46c to 49c and 46d to 49d of the tracking coils 46 to 49 has decreased by 20 percent, and the density of the magnetic flux passing through any of the ineffective winding portions 46e to 49e and 46f to 49f has increased by 20 percent. The direction of the electromagnetic force acting on each of the ineffective winding portions 46c to 46f, 47c to 47f, 48c to 48f, and 49c to 49f of the tracking coils 46 to 49 is indicated by an arrow, and the magnitude of the electromagnetic force is indicated by the factor attached to the letter "f" appearing near the arrow. As can be seen from FIG. 3B, the electromagnetic forces acting on the ineffective winding portions are cancelled with each other in the tracking coils 46 to 49. As a result, the moments M1 and M2 about the center point O of the printed coil board 4a become equal to each other, and the resultant moment M is therefore zero. In other words, the moment shown in the prior art example of FIG. 14B does not occur. Accordingly, the radial tilt of the moving member 50 does not occur, and therefore the spot focused on the disc surface is free from aberrations. This makes high speed and accurate recording and reproducing operation possible.

The following modifications can be made to the configuration of the present embodiment without departing from the scope of the embodiment.

(1) Instead of using the printed coil boards 4a and 4b each fabricated by forming the focusing coil 5a and tracking coils 46 to 49 in integral fashion, thin focusing coils and tracking coils fabricated by winding enameled wires may be attached to the lens holder 2.

(2) As shown in FIG. 5A, the magnet 8a, 8b, 8c and 8d may be constructed from an assembly of two one-pole magnetized magnets 8a3 and four one-pole magnetized magnets 8a4, each magnetized so that one magnetic pole, N or S, is formed on the surface facing the printed coil board 4a. Alternatively, as shown in FIG. 5B, a multi-pole magnetized one-piece magnet 8a5 may be used for the magnets 8a to 8d. The magnet 8a5 has six magnetic poles on the surface facing to the printed coil board 4a. Dashed lines MB in the figure indicate magnetization boundary lines. This configuration serves to reduce the number of components, and assembly work is simplified.

(3) In the configuration of FIG. 1, a strong magnetic circuit is achieved by using two magnets 8a and 8b. However, in an optical disc drive where a cost reduction is demanded, a counter yoke (not shown) may be used instead of the magnet 8b. This serves to reduce the number of components, and achieves an objective lens driving apparatus that is low cost and that does not cause a radial tilt in the moving member 50.

(4) In the configuration of FIG. 1, the printed coil boards 4a and 4b are fixed to the lens holder 2 at both ends. Further, space for accommodating the yoke base plate 18 and the magnet 8b is provided between the printed coil board 4a and the objective lens 1. The magnet 8b may be reduced in size by constructing it from the magnet 8b1 alone that has two magnetic poles arranged along the focusing direction Fo. By reducing the space, the size and weight of the lens holder 2 can also be reduced so that the acceleration sensitivity can be increased. In this case, the size of the magnet 8b1 is made just large enough to cover the focusing coil 5a and winding portions of respective sides of the tracking coils 46 to 49 perpendicular to the tracking direction Tk and located nearer to the focusing coil 5a. By this configuration, the magnet 8b1 also contributes to generate the tracking drive force.

In the objective lens driving apparatus shown in FIG. 1, a first driving section comprising the printed coil board 4a and magnets 8a and 8b and a second driving section comprising the printed coil board 4b and magnets 8c and 8d are arranged on both sides of the objective lens 1. In the present embodiment, one of the first driving section and the second driving section may be omitted; in that case also, the effect and advantage of the present embodiment can be achieved.

According to the present embodiment, since the magnets 8a and 8b are made large enough to cover the focusing coil 5a and all the winding portions of the tracking coils 46 to 49, a large driving force and high driving sensitivity can be obtained. Furthermore, the moments about the center point O of the printed coil board 4a, caused by the electromagnetic forces acting on the winding portions on the sides of the tracking coils 46 to 49 perpendicular to the focusing direction Fo are cancelled. This serves to suppresses the radial tilt of the moving member 50, and realizes stable recording and reproducing operation under high speed driving conditions.

Second Embodiment

The second embodiment of the present invention differs from the first embodiment in the arrangement of the focusing coil 5a and tracking coils 46 to 49 on the printed coil board 4a and the arrangement of the magnetic poles of the magnet 8a. Remaining configuration is essentially the same as that of the first embodiment, and the same description will not be repeated here.

Figure 6:
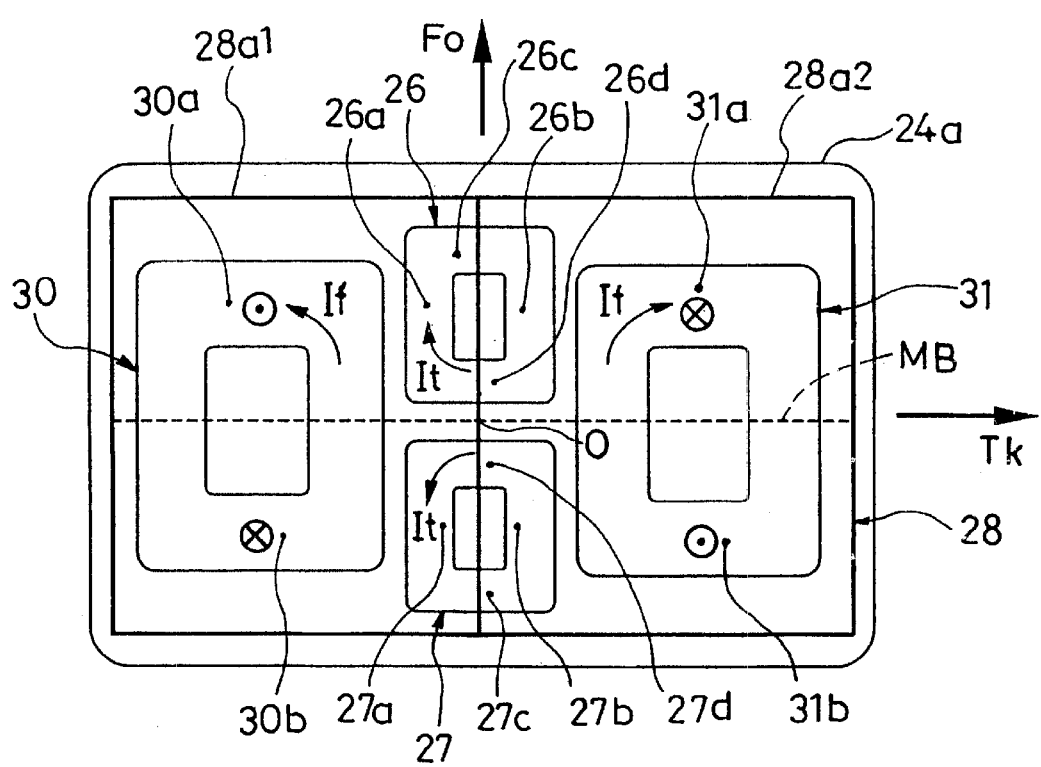
FIG. 6 is a plan view showing a printed coil board and a magnet in an objective lens driving apparatus according to a second embodiment of the present invention.

FIG. 6 is a plan view similar to FIG. 2A, showing the printed coil board 24a and magnet 28 in the objective lens driving apparatus according to the second embodiment of the present invention.

As shown in FIG. 6, two tracking coils 26 and 27 substantially rectangular in shape are arranged vertically in the center portion of the printed coil board 24a. On both sides of the tracking coils 26 and 27 are arranged focusing coils 30 and 31 substantially rectangular in shape. Two tracking coils 26 and 27 are connected in series so that the current flows in the direction indicated by arrow It. The focusing coils 30 and 31 are connected in series so that the current flows in the direction indicated by arrow If. Magnets 28a1 and 28a2 constituting the magnet 28 are formed so that opposite magnetic poles face the winding portions 26a, 26b, and the winding portions 27a, 27b on the two sides of the tracking coils 26 and 27 which extend perpendicularly to the tracking direction Tk. The magnets 28a1 and 28a2 are also arranged so that opposite magnetic poles face the winding portions 30a, 30b, and the winding portions 31a, 31b on the two sides of the respective focusing coils 30 and 31 which extend perpendicularly to the focusing direction Fo. The magnet 28 is constructed by combining two two-pole magnetized magnets 28a1 and 28a2, as shown in FIG. 6. Dashed line MB indicates the magnetization boundary line. The magnet 28 may be constructed from four one-pole magnetized magnets. Alternatively, it may be constructed from one four-pole magnetized magnet having four magnetic poles on the same plane (not shown here).

In the second embodiment, since the driving force is exerted on all the winding portions 26a, 26b, 27a, and 27b on two sides of the respective tracking coils 26 and 27, as in the first embodiment, a high acceleration sensitivity is realizable in tracking motion. Moreover, the provision of two focusing coils 30 and 31 serves to increase the acceleration sensitivity in focusing motion. As a result, the focusing and track-following capability of the objective lens increases, making high speed record and reproduction possible. Furthermore, the moments about the coil center point O, caused by the electromagnetic forces acting on the winding portions 26c, 26d, 27c, and 27d on the sides of the tracking coils 26 and 27 extending perpendicularly to the focusing direction, are cancelled with each other, serving to suppress the radial tilt of the moving member 50. Further, since the focusing coils 30 and 31 are larger in size than the tracking coils 26 and 27, a large driving force in the focusing direction can be obtained.

According to the second embodiment, the objective lens driving apparatus is improved in the acceleration sensitivity, and has an increased driving sensitivity. Further, since the radial tilt of the moving member 50 is suppressed, stable recording and reproducing operation can be achieved under high speed driving conditions. The number of magnetic poles of the magnet 28 facing the printed coil board 24a is four, which is fewer than six magnetic poles used in the first embodiment. This serves to simplify the construction of the magnet and reduce the cost of the apparatus.

Third Embodiment

The third embodiment differs from the first embodiment in that modifications are made to the printed coil board 4a, the tracking coils 46 to 49, and the magnet 8a. Remaining configuration is the same as that of the first embodiment, and the same description will not be repeated here.

Figure 7A:
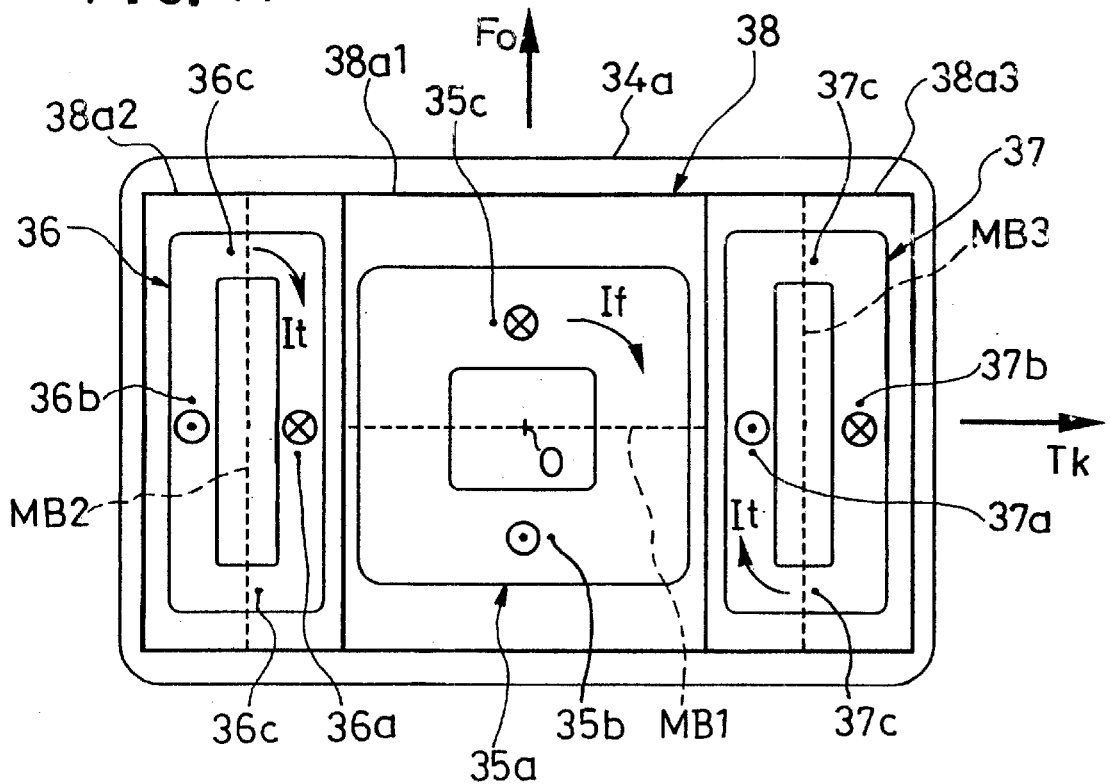
FIG. 7A is a plan view showing a printed coil board and a magnet in an objective lens driving apparatus according to a third embodiment of the present invention.

FIG. 7A is a plan view, similar to FIG. 2A, showing the printed coil board 34a and magnet 38 in the objective lens driving apparatus according to the third embodiment of the present invention.

As shown in FIG. 7A, a focusing coil 35a substantially rectangular in shape is arranged in the center portion of the printed coil board 34a. On both sides of the focusing coil 35a are arranged tracking coils 36 and 37 substantially rectangular in shape. Two tracking coils 36 and 37 are connected in series so that the current flows in the direction indicated by arrow It.

Figure 7B:
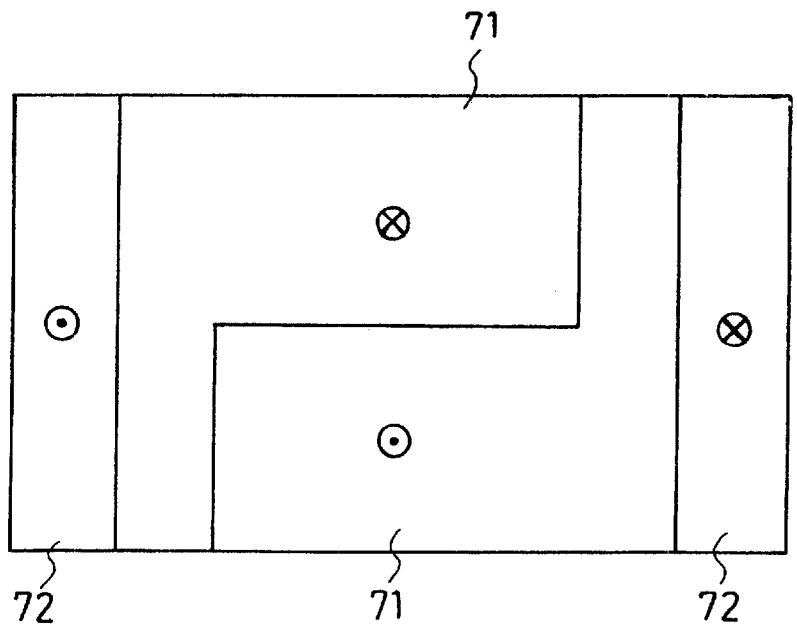
FIG. 7B is a plan view showing another example of a magnet in the third embodiment.

The magnet 38 is constructed from three two-pole magnetized magnets 38a1, 38a2, and 38a3. The magnetization boundary line of each magnet is shown by respective dashed line MB1, MB2 and MB3. The magnet 38a1 has opposite magnetic poles at positions opposite to the winding portions 35b and 35c located on two sides of the focusing coil 35a which are perpendicular to the focusing direction Fo. The magnets 38a2 and 38a3 each have opposite magnetic poles at positions opposite to the winding portions 36a and 36b or 37a and 37b located on two sides of the tracking coil 36 or 37, respectively, which are perpendicular to the tracking direction Tk. Instead of combining the three magnets 38a1, 38a2, and 38a3 as shown in FIG. 7A, the magnet 38 may be constructed by assembling six one-pole magnetized magnets together. Alternatively, as shown in FIG. 7B, the magnet 38 may be configured by two L-shaped one-pole-magnetized magnets 71 and two bar-shaped one-pole-magnetized magnets 72.

According to the magnetic circuit configuration of FIG. 7A, since the driving force is exerted on all the winding portions 36a, 36b, 37a, and 37b on two sides of the tracking coils 36 and 37 effective for tracking drive motion, the acceleration sensitivity increases. As a result, the focusing and track-following capability of the objective lens 1 increases, making high speed recording and reproducing operation possible. Furthermore, the moments about the coil center point O, caused by the electromagnetic forces acting on the winding portions 36c and 37c, i.e., the ineffective portions, on the sides of the tracking coils 36 and 37 perpendicular to the focusing direction Fo, are cancelled with each other, serving to suppress the radial tilt of the moving member 50.

According to the third embodiment, since the tracking coils 36 and 37 are longer in the focusing direction, effective winding portions 36a, 36b, 37a, and 37b perpendicular to the tracking direction Tk are longer than ineffective winding portions 36c and 37c perpendicular to the focusing direction Fo. Since the proportion of the effective portions in the tracking coils 36 and 37 is large, the acceleration sensitivity in tracking motion increases correspondingly. Furthermore, since the tracking coils 36 and 37 are not split into two sections as in the case of the tracking coils 46 to 49 in FIG. 2, the construction is simple and the thickness can be reduced. Accordingly, the objective lens driving apparatus of the third embodiment is suitable for use in thin optical disc drives for notebook PCs, etc.

Fourth Embodiment

Figure 8:
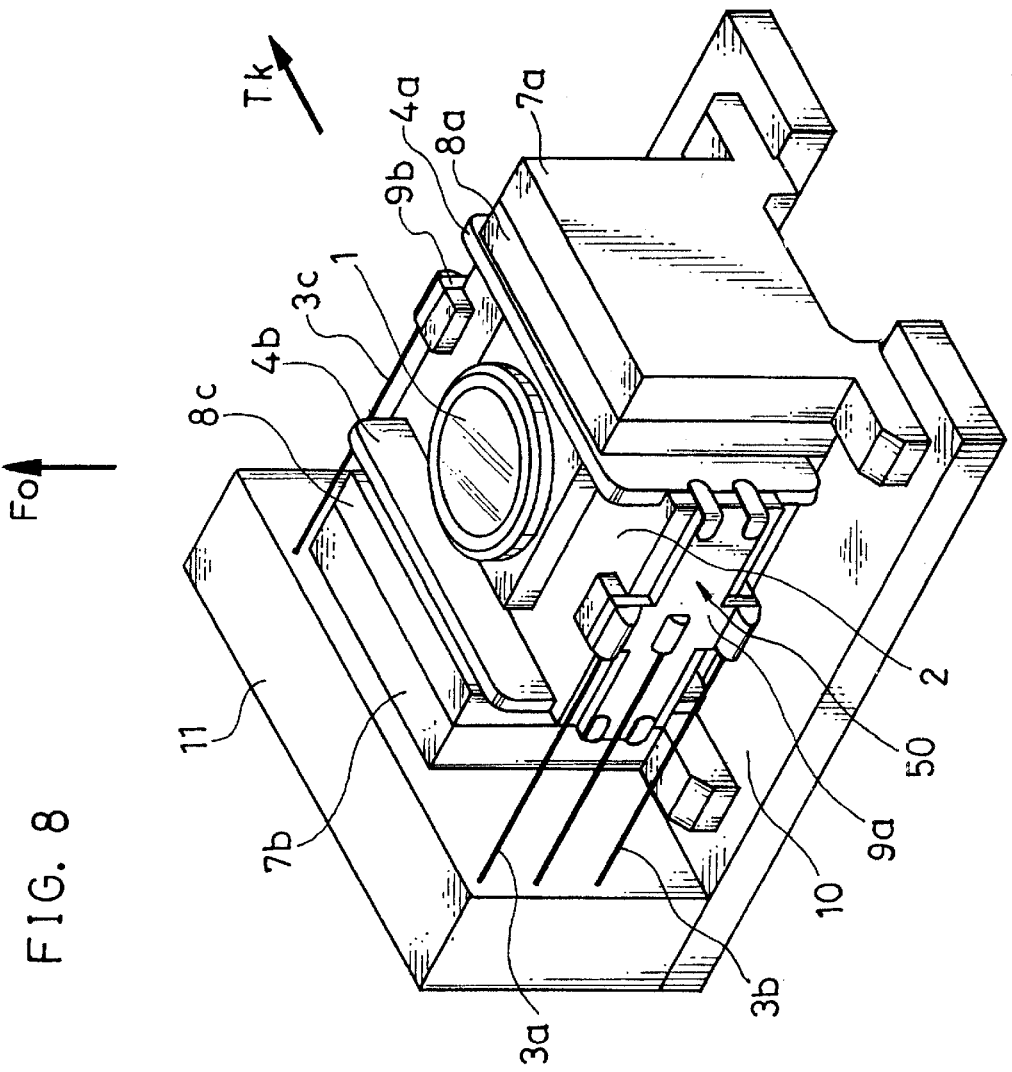
FIG. 8 is a perspective view of the relevant parts of an objective lens driving apparatus according to a fourth embodiment of the present invention.

FIG. 8 is a perspective view showing the relevant parts of an objective lens driving apparatus according to a fourth embodiment of the present invention. In the figure, printed coil boards 4a and 4b having identically shaped coils are rigidly fixed to both side faces of the lens holder 2 on which the objective lens 1 is supported. The printed coil boards 4a and 4b are connected together by interconnecting printed boards 9a and 9b. The outside of the printed coil board 4a faces the magnet 8a mounted on the yoke base 7a, with a predetermined gap provided between the printed coil board 4a and the magnet 8a. Similarly, the outside of the printed coil board 4b faces the magnet 8b mounted on the yoke base 7b, with a predetermined gap provided between the printed coil board 4b and the magnet 8b. The yoke bases 7a and 7ba are fixed to the base 10. The printed coil boards 4a and 4b and the magnet 8a are the same as those shown in FIG. 2.

According to the magnetic circuit configuration of the fourth embodiment, the driving force is exerted on all the winding portions 46a to 49a and 46b to 49b on two sides of the tracking coils 46 to 49, as in the first embodiment shown in FIG. 2. Accordingly, a high tracking capability in the objective lens 1 is achieved, and high speed recording and reproducing operation is realizable. Further, the moments about the center of the printed coil boards 4a and 4b, caused by the electromagnetic forces acting on the ineffective winding portions on the sides of the tracking coils 46 to 49 perpendicular to the focusing direction Fo are cancelled each other, serving to suppress the radial tilt of the moving member 50.

In the fourth embodiment, two magnets 8a and 8c are included. Therefore, the number of magnets is reduced by half compared with four in the first to third embodiments. This is effective in applications where a cost reduction is demanded. In the configuration of the above-mentioned first embodiment, the distance from the printed coils 4a and 4b to the objective lens 1 in the driving member 50 is relatively large. Accordingly, depending on the shape of the lens holder 2, rigidity may decrease, and a resonant frequency lowers in the driving member 5. In the fourth embodiment, since the distance from the printed coil boards 4a and 4b to the objective lens is reduced, as shown in FIG. 8, the resonant frequency can be made sufficiently high, regardless of the shape of the lens holder 2. This allows the selection of a material of a low relative density and a low rigidity for the lens holder 2. Accordingly, the weight of the moving member 50 can be reduced, and thus an objective lens driving apparatus having a high acceleration sensitivity can be realized.

Fifth Embodiment

The fifth embodiment differs from the first embodiment in the configuration of the focusing coil and tracking coils on the printed coil board 4a and in the arrangement of the magnetic poles of the magnet 8a. Remaining configuration is the same as that of the first embodiment, and the same description will not be repeated here.

Figure 9A:
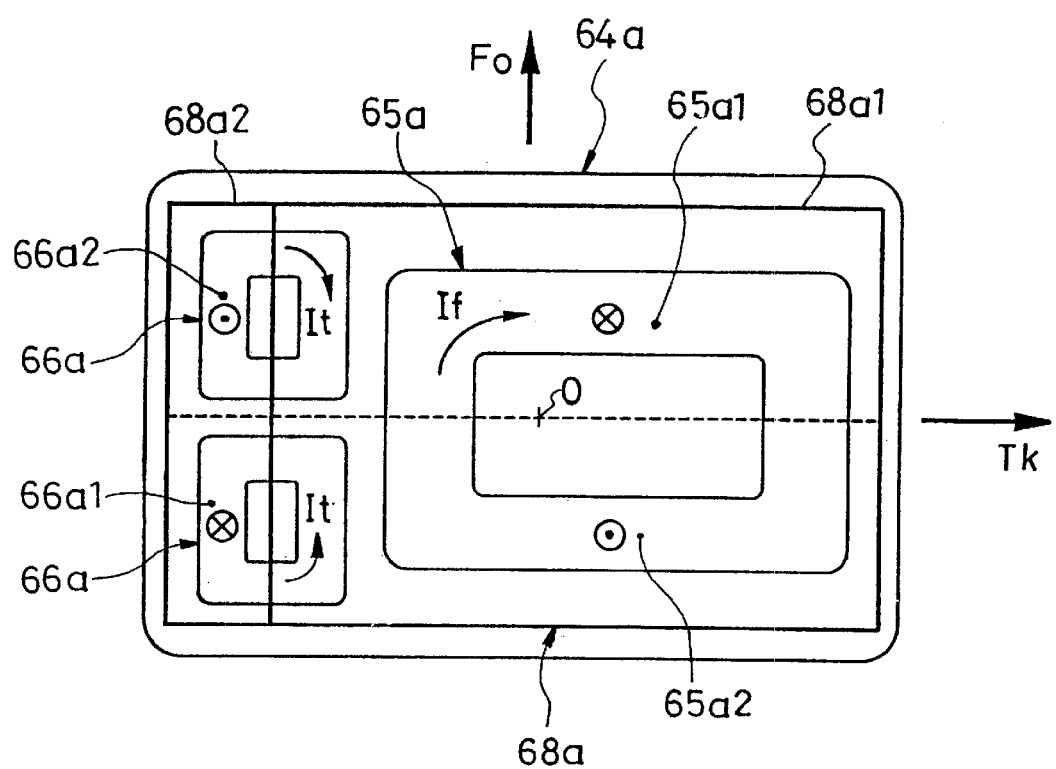
FIG. 9A is a plan view showing a printed coil board and a magnet in an objective lens driving apparatus according to a fifth embodiment of the present invention.

FIG. 9A is a plan view, similar to FIG. 2A, showing the printed coil board 64a and magnet 68a in the objective lens driving apparatus according to the fifth embodiment of the present invention.

In FIG. 9A, two tracking coils 66a substantially rectangular in shape are arranged in the left end portion of the printed coil board 64a. One focusing coil 65a substantially rectangular in shape is arranged in the remaining portion of the printed coil board 64a. The tracking coils 66a and the focusing coil 65a are asymmetric about the center line of the printed coil board 64a parallel to the focusing direction. Two tracking coils 66a are connected in series so that the current flows through both the tracking coils 66a in the direction indicated by arrow It.

The magnet 68a1 is formed so that opposite magnetic poles face the winding portions 65a1 and 65a2 on two sides of the focusing coil 65a which are perpendicular to the focusing direction Fo. The magnet 68a2 is formed so that opposite magnetic poles face the respective winding portions 66a1 of the tracking coils 66a perpendicular to the tracking direction Tk. Instead of combining two two-pole magnetized magnets as shown in FIG. 9A, the magnet 68a may be constructed by assembling four one-pole magnetized magnets together. Alternatively, it may be constructed from one four-pole magnetized magnet having four magnetic poles on the same plane.

Figure 9B:
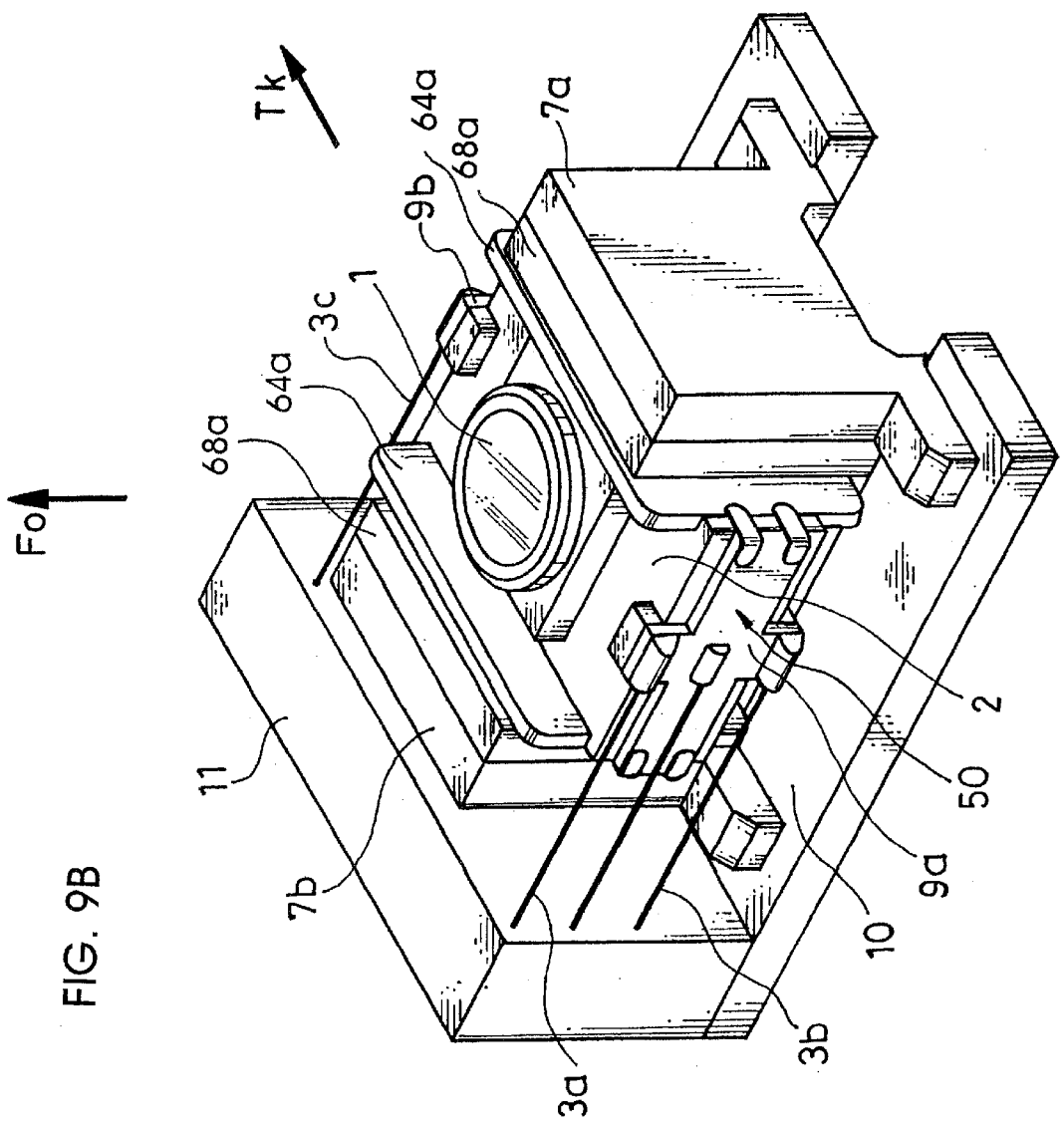
FIG. 9B is a perspective view of the relevant parts of an objective lens driving apparatus according to the fifth embodiment of the present invention.

The printed coil board 64a corresponds to the printed coil board 4a in FIG. 1. The magnet 68a corresponds to the magnet 8a. In the objective lens driving apparatus of the fifth embodiment, a magnet and a printed coil board corresponding to the magnets 8b to 8d and printed coil board 4b in FIG. 1 are the same as the magnet 68a and printed coil board 64a shown in FIGS. 9A and 9B, but rotated 180 degrees with respect to the magnet 68a and printed coil board 64a, respectively. As shown in FIG. 9B, both the magnets 68a and both the printed coil boards 64a are respectively symmetric with respect to the optical axis of the objective lens 1. Current are supplied to both the focusing coils 65a and both the tracking coils 66a so that electromagnetic forces will be exerted in the same focusing direction Fo and the same tracking direction Tk, respectively.

According to the fifth embodiment, since the driving force is exerted on all the winding portions of two sides of each tracking coil 66a, the acceleration sensitivity increases. As a result, the focusing and track-following ability of the objective lens increases, and high speed recording and reproducing operation is achieved. Furthermore, the moments about the center point O, caused by the electromagnetic forces acting on the ineffective portions, i.e., the winding portions on the sides of the tracking coils 66a perpendicular to the focusing direction Fo, are cancelled with each other, serving to suppress the radial tilt of the moving member 50.

Consequently, stable recording and reproducing operation is realizable under high speed driving. Since the focusing coil 65a has the winding portions 65a1 and 65a2 which are longer in the tracking direction Tk, the area of the effective winding portions 65a1 and 65a2 perpendicular to the focusing direction Fo increases, while the area of the ineffective portions perpendicular to the tracking direction Tk decreases. The proportion of the effective portions in the entire focusing coil 65a increases, and the acceleration sensitivity further is improved. The objective lens driving apparatus of the present embodiment is particularly suited for applications where a high driving sensitivity is demanded in the focusing direction Fo. The number of magnetic poles of the magnet 68a is four, which is fewer than the six poles of the magnet 8a in the first embodiment, and the cost of the magnet 68a can be reduced correspondingly.

Sixth Embodiment

Figure 10:
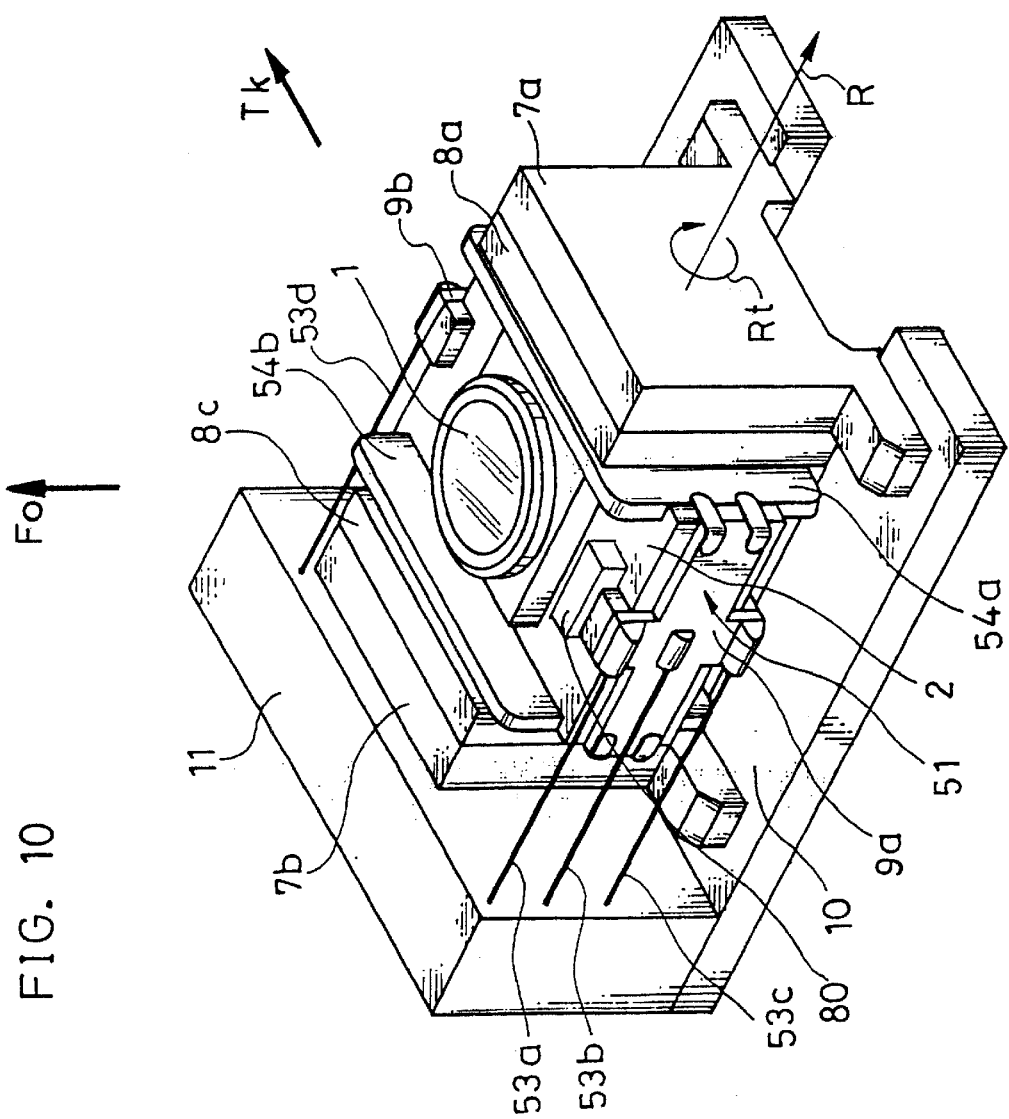
FIG. 10 is a perspective view of the relevant parts of an objective lens driving apparatus according to a sixth embodiment of the present invention.

FIG. 10 is a perspective view showing the relevant parts of an objective lens driving apparatus according to a sixth embodiment of the present invention. The construction of this embodiment is similar to that of the objective lens driving apparatus of the fourth embodiment shown in FIG. 8. Differences are in the configuration of suspension wires 53a to 53d and the configuration of printed coil boards 54a and 54b.

In FIG. 10, the suspension wires 53a, 53b, 53c, and 53d are each fastened at one end to the interconnecting printed board 9a or 9b and at the other end to the wire holder 11. There are six suspension wires in total, but in FIG. 10, four suspension wires 53a to 53d are shown. The remaining two suspension wires 53e and 53f hidden from view are suspended in parallel to the suspension wire 53d between the interconnecting printed board 9b and the wire holder 11. Arrow R is an axis passing through the centers of the printed coil boards 54a and 54b and perpendicular to the tracking direction Tk, and hereinafter is referred to as axis R. The direction of rotation about the axis R is shown by arrow Rt. The arrow Rt shows the radial tilt, i.e., the tilt of the moving member 51 including the objective lens 1 in the tracking direction Tk (the radial direction of the disc).

Figure 11A:
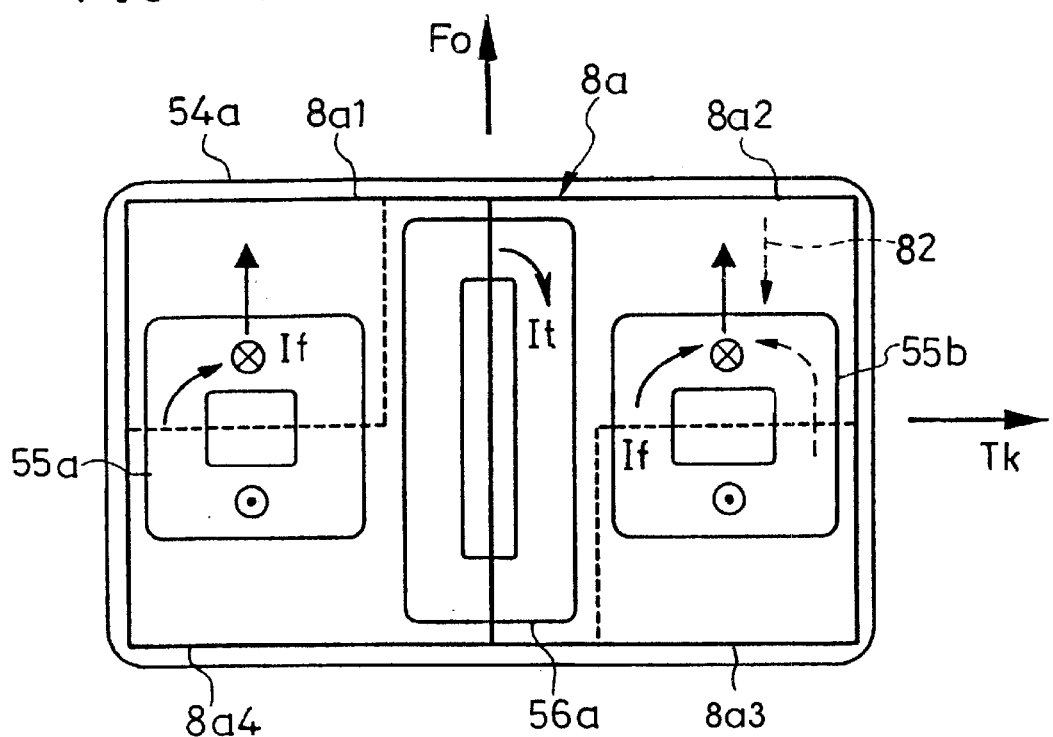
FIG. 11A and FIG. 11B are plan views each showing a printed coil board and a magnet in the objective lens driving apparatus according to the sixth embodiment of the present invention.
Figure 11B:
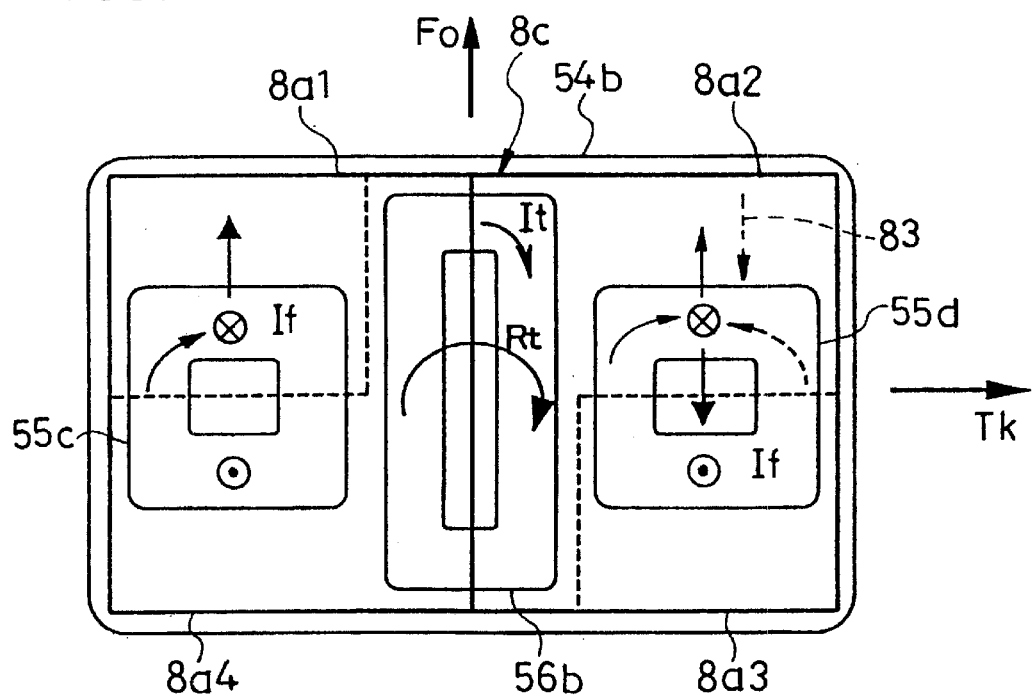

FIG. 11A and FIG. 11B are plan views of the printed coil boards 54a and 54b, respectively, as seen in the direction of the axis R. The magnets 8a and 8c are configured of a pair of a left magnet and a right magnet which contact along the boundary passing through the center of the tracking coils 56a and 56b and parallel to the focusing direction Fo, respectively. The left magnet includes magnet poles 8a1 and 8a4, and the right magnet includes magnet poles 8a2 and 8a3. Each of the magnet poles 8a1 and 8a3 has a rectangular region encircled by a dashed line. Each of the magnet poles 8a2 and 8a4 has a L-shaped region encircled by the dashed line and the boundary. The printed coil boards 54a and 54b include substantially rectangularly shaped tracking coils 56a and 56b, respectively, in their center portions. Focusing coils 55a and 55b substantially rectangular in shape are formed on both sides of the tracking coil 56a on the printed coil board 54a. Likewise, focusing coils 55c and 55d substantially rectangular in shape are formed on both sides of the tracking coil 56b on the printed coil board 54b. The focusing coils 55a and 55c are interconnected via the interconnecting printed board 9a. The winding direction of the focusing coils 55a and 55c and the orientation of the magnetic poles of the magnets 8a and 8c are determined so that when the current If is flown through the focusing coils 55a and 55c, the focusing coils 55a and 55c generate driving forces in the same focusing direction Fo. Similarly, the focusing coils 55b and 55d are interconnected via the interconnecting printed board 9b. The winding direction of the focusing coils 55b and 55d and the orientation of the magnetic poles of the magnets 8a and 8c are determined so that when the currents. If is flown to the focusing coils 55b and 55d, the focusing coils 55b and 55d generate driving forces in the same focusing direction Fo.

The tracking coils 56a and 56b are interconnected via the interconnecting printed boards 9a and 9b. The winding direction of the tracking coils 56a and 56b and the orientation of the magnetic poles of the magnets 8a and 8b are determined so that when the current It is flown through the tracking coils 56a and 56b, the tracking coils 56a and 56b generate driving forces in the same tracking direction Tk. Two suspension wires of the six suspension wires 53a to 53f are used to supply drive current to the focusing coils 55a and 55c. Two suspension wires are used to supply drive current to the focusing coils 55b and 55d. The remaining two suspension wires are used to supply drive current to the tracking coils 56a and 56b.

Operation will be described with reference to FIG. 11A and FIG. 11B. In driving operation in the focusing direction Fo, currents of the same direction indicated by arrow If are supplied to the focusing coils 55a to 55d. As a result, the focusing coils 55a to 55d generate driving forces in the focusing direction Fo, accomplishing the focusing action of the moving member 51.

In driving operation in the tracking direction Tk, current of the direction indicated by arrow It is supplied to the tracking coils 56a and 56b. As a result, the tracking coils 56a and 56b generate driving forces in the same tracking direction Tk, accomplishing the tracking action of the moving member 51.

In the first to fifth embodiments earlier described, the radial tilt of the moving member 50 or 51 does not occur. However, in the fabrication of the objective lens driving apparatus, dimensional errors which are not negligible exist in constituent elements such as the printed coil boards, magnets, and suspension wires. Further, in assembly process, assembly errors are unavoidable. Manufacturing variations in the constituent elements, including the dimensional errors and the assembly errors, are liable to produce a radial tilt in the completed objective lens driving apparatus. Moreover, there are occasions where the disc warps in the radial direction. The radial tilt with respect to the objective lens arises due to the warp of the disc. In the objective lens driving apparatus of the sixth embodiment, currents are supplied to the pair of focusing coils 53a and 53c and the pair of focusing coils 53b and 53d through the separate suspension wire pairs. Therefore, respective currents which are different in directions or values with each other can be supplied to the pair of focusing coils 53a and 53c and the pair of focusing coils 53b and 53d, respectively. In the present embodiment, the radial tilt due to manufacturing variations is detected by a tilt sensor 80 of a known configuration attached to the moving member 51. Based on the detection result by the tilt sensor 80, for example, the direction of the current If flowing through the focusing coils 55b and 55d is changed as shown by dashed lines in FIG. 11A and FIG. 11B. The focusing coils 55b and 55d are driven in the direction indicated by dashed line arrows 82, 83. Consequently, a rotating force in the direction indicated by the arrow Rt in FIG. 10 and FIG. 11B is given to the printed coil boards 54a and 54b. As a result, the moving member 51 rotates in the direction indicated by the arrow Rt and thus tilts in the radial direction. When the current If to be supplied to the focusing coils 55b and 55d is controlled in accordance with the detection output of the tilt sensor 80, the radial tilt caused due to manufacturing variations or aging can be corrected.

Figure 11C:
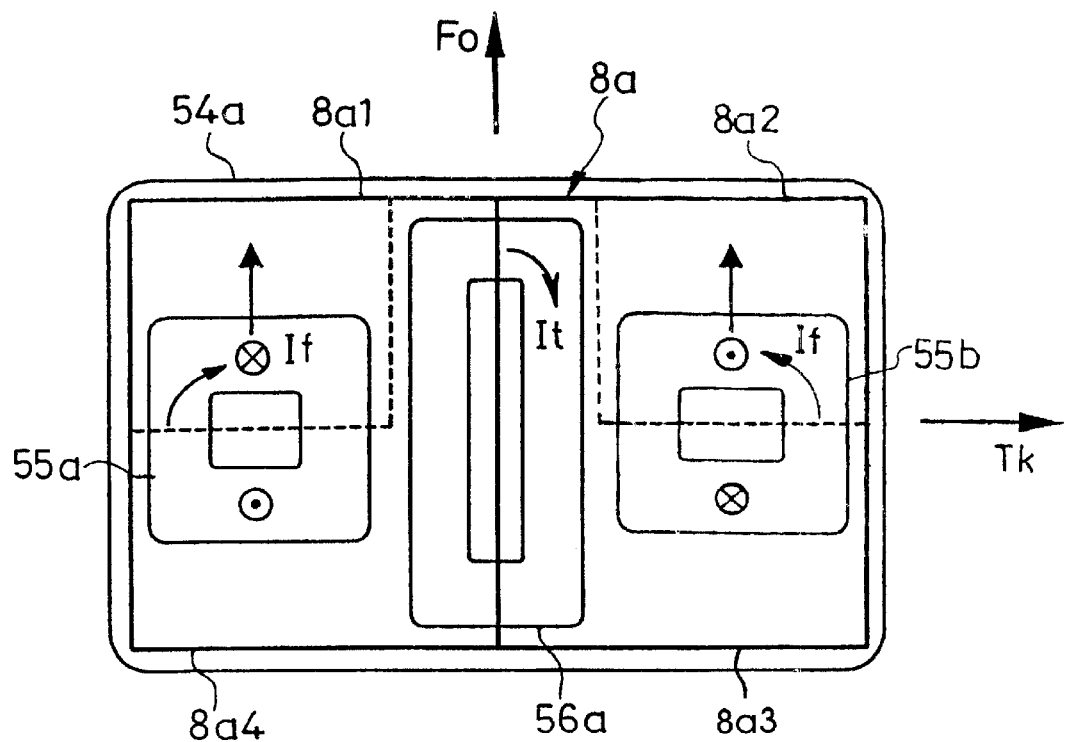
FIG. 11C and FIG. 11D are plan views each showing a printed coil board and a magnet in the objective lens driving apparatus according to another example of the sixth embodiment of the present invention.
Figure 11D:
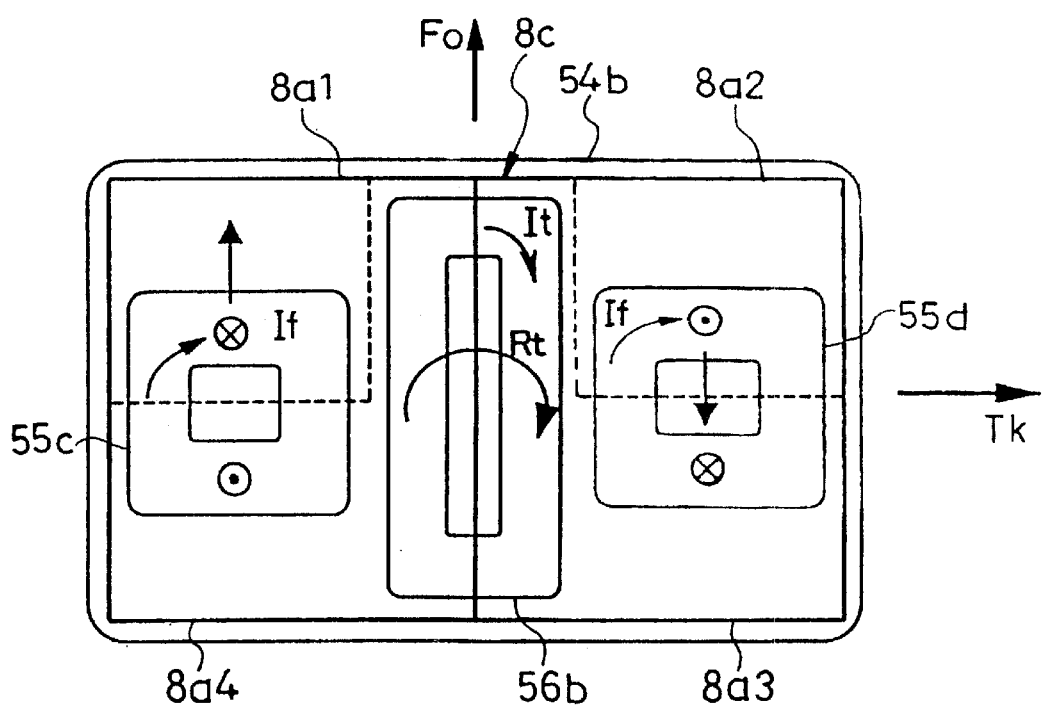
Figure 12:
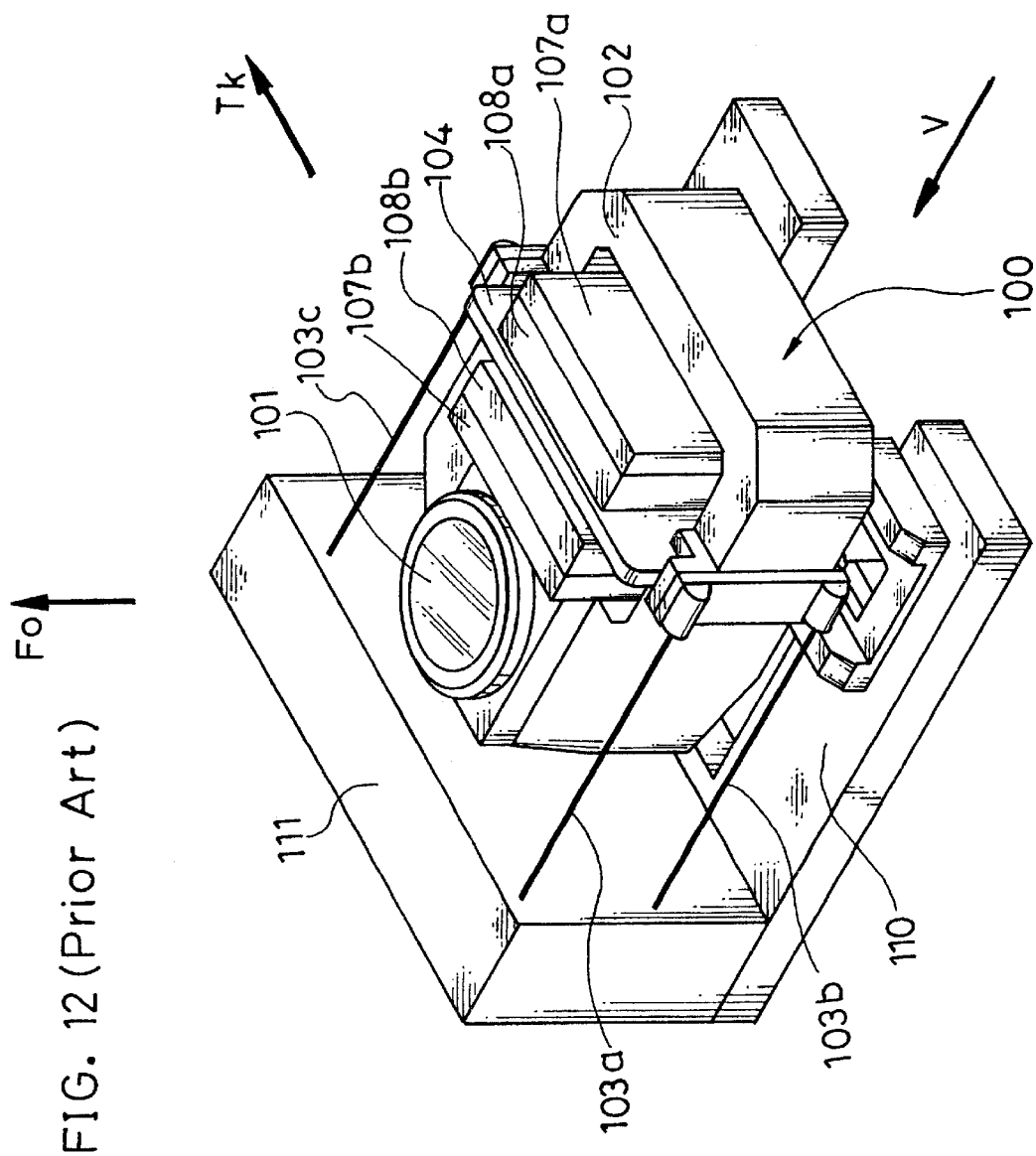
FIG. 12 is the perspective view of the relevant parts of the objective lens driving apparatus in the prior art.
Figure 13:
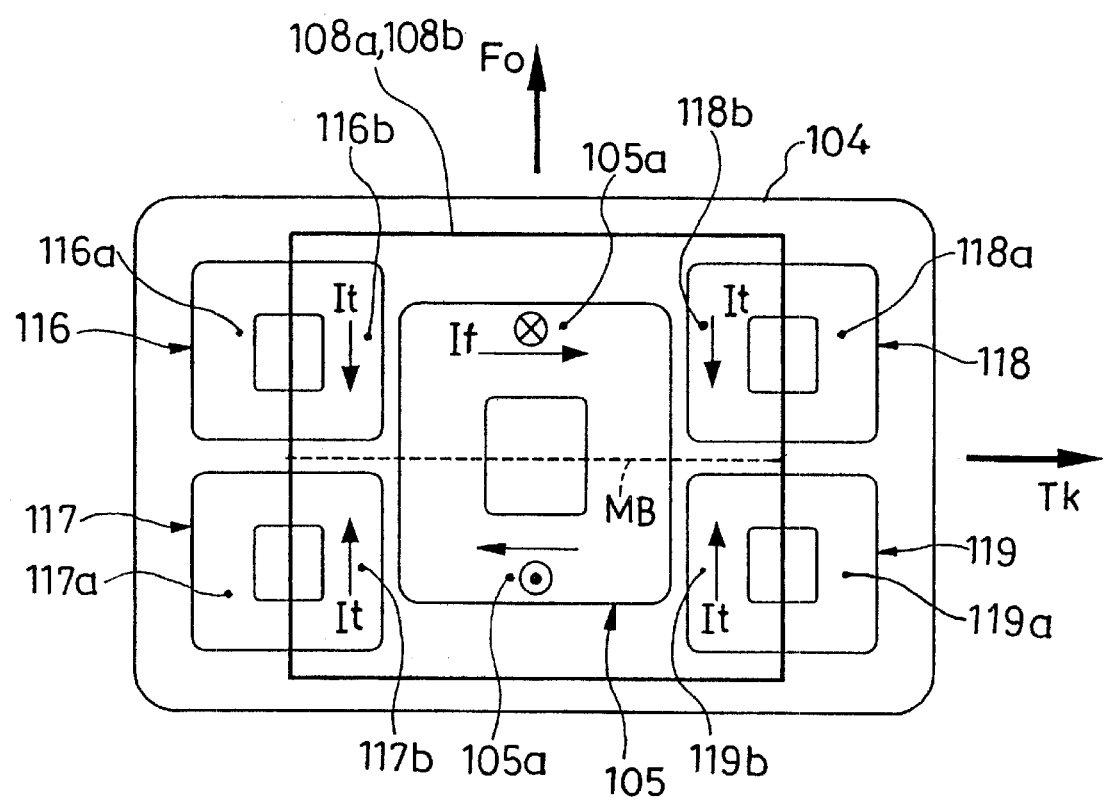
FIG. 13 is the plan view of the printed coil board and the magnet in the prior art objective lens driving apparatus as seen from the direction of arrow V in FIG. 12.

FIG. 11C is a plan view of the magnet 8a and the printed coil board 54a, and FIG. 11D is a plan view of the magnet 8c and the printed coil board 54b in another example of the sixth embodiment. The focusing coils 55a, 55b, 55c and 55d, and the tracking coils 56a and 56b are configured in the same manner as those in FIG. 11A and FIG. 11B. Each of the magnets 8a and 8c shown in FIG. 11C and FIG. 11D respectively, is configured of a pair of a left magnet and a right magnet which contact along the boundary passing through the center of the tracking coils 56a or 56b and parallel to the focusing direction Fo. The left magnet includes magnet poles 8a1 and 8a4, and the right magnet includes magnet poles 8a2 and 8a3. The magnet poles 8a1 and 8a2 have rectangular regions which are encircled by respective dashed lines, and are symmetrical with respect to the respective boundaries. The magnet poles 8a3 and 8a4 have L-shaped regions encircled by the respective dashed lines and the respective boundaries, and are symmetrical with respect to the respective boundaries.

In the magnets 8a and 8c and the printed coil boards 54a and 54b shown in FIG. 11C and FIG. 11D, the printed coil boards 54a and 54b can be driven in a desired focusing direction Fo and a desired tracking direction Tk bypassing currents If through the focusing coils 55a, 55b, 55c and 55d in the directions shown by the respective arrows If, and passing the current It through the tracking coils 56a and 56b. The radial tilt caused due to manufacturing variation or aging can be corrected by controlling the current If corresponding to the detection output of the tilt sensor 80. The magnets 8a and 8c may be replaced with a multi-pole magnetized magnet including four magnet poles 8a1, 8a2, 8a3 and 8a4 in one body and located in opposed relationship to the printed coil boards 54a and 54b.

According to the sixth embodiment, a driving force is given to the winding portions on two sides of the tracking coils 56a and 56b effective to for tracking drive motion, and a driving force is given to the winding portions on two sides of the focusing coils 55a to 55d effective to focusing drive motion. Consequently, the acceleration sensitivity is improved the tracking ability of the objective lens is also improved and making high speed recording and reproducing operation possible. Furthermore, by independently driving the plurality of focusing coils arranged on the printed coil board, the radial tilt can be corrected. The same effect can also be obtained in the case that a plurality of tracking coils are arranged in the focusing direction on the printed coil board and driven independently.

As described above, the objective lens driving apparatus according to the present embodiment has a high driving sensitivity, and is capable of controlling the tilt in the radial direction by applying drive currents of different directions or different values to the plurality of focusing coils, thereby the tilt of the objective lens 1 is corrected relative to the disc, and stable record and reproduction is realizable. It will also be noted that by supplying the current If of the same direction to the focusing coils 30 and 31 on the printed coil board 24a shown in FIG. 6, a rotational force can be applied to the moving member 50, and the radial tilt can be controlled.

What is claimed is:

1. An objective lens driving apparatus comprising:
   an objective lens (1) for focusing a light beam on a disc for recording and reproducing information on said disc;
   a lens holder (2) for holding said objective lens;
   a plurality of supporting members (3a–3d) for supporting said lens holder so as to be movable in a focusing direction (Fo) of the optical axis direction of said objective lens, and also in a tracking direction (Tk) of a radial direction of said disc;
   a coil assembly (4a) having a focusing coil (5a) formed so as to include a line of intersection of the plane of the focusing coil and the plane being perpendicular to the tracking direction (Tk) and including the optical axis of said objective lens as a center line and at least two tracking coils (46–49) arranged on both sides of said focusing coil symmetrically to a center line being parallel to said tracking direction of said focusing coil and aligned in a direction normal to said center line on a plane including the focusing direction and the tracking direction of said lens holder; and
   a magnet assembly (8a) including:
      a first magnet (8a1), disposed opposite to said focusing coil, edges of said first magnet extending parallel to said focusing direction passing through the centers of said tracking coils facing one-half region of each of said tracking coils, said first magnet having magnetic poles arranged at positions opposite to winding portions of said focusing coil extending in a direction intersecting said focusing direction; and
      a second magnet (8a2) disposed so as to face the remaining one-half region of each of said tracking coils, and having magnetic poles arranged at positions opposite to winding portions of said tracking coils extending in a direction intersecting said tracking direction.

2. An objective lens driving apparatus in accordance with claim 1, wherein
   said center line of said focusing coil extending in parallel to said tracking direction lies on a magnetization boundary line (MB) of said first and second magnets.

3. An objective lens driving apparatus comprising:
   an objective lens (1) for focusing a light beam on a disc for recording and reproducing information on said disc;
   a lens holder (2) for holding said objective lens;
   a plurality of supporting members (3a–3d) for supporting said lens holder so as to be movable in a focusing direction (Fo) along the optical axis of said objective lens, and also in a tracking direction (Tk) of a radial direction of said disc;
   a coil assembly (34a) having a focusing coil (35a) formed so as to include a line of intersection of the plane of the focusing coil and the plane being perpendicular to the tracking direction (Tk) and including the optical axis of said objective lens as a center line and at least two tracking coils (36, 37) lies on both sides in the tracking direction of said focusing coil on a plane including a focusing direction and a tracking direction of said lens holder; and
   a magnet assembly (38a) including:
      a first magnet (38a1), disposed opposite to said focusing coil, and having magnetic poles arranged at positions opposite to winding portions of said focusing coil extending in a direction intersecting said focusing direction; and
      two second magnets (38a2, 38a3), disposed opposite to said tracking coil, and having magnetic poles arranged at positions opposite to winding portions of said tracking coils extending in a direction intersecting said tracking direction.

4. An objective lens driving apparatus in accordance with claim 3,
   wherein
      the length of said tracking coil in the focusing direction is longer than that of the tracking coil in the tracking direction.

5. An objective lens driving apparatus comprising:
   an objective lens (1) for focusing a light beam on a disc for recording and reproducing information on said disc;
   a lens holder (2) for holding said objective lens;
   a plurality of supporting members (3a–3d) for supporting said lens holder so as to be movable in a focusing direction (Fo) of the optical axis direction of said objective lens, and also in a tracking direction (Tk) of a radial direction of said disc;
   a coil assembly (64a) having a focusing coil (65a) asymmetrically with respect to the line of intersection of the plane including the focusing direction and the tracking direction of said lens holder and the plane including the optical axis of said objective lens and being perpendicular to said tracking direction, and at least one tracking coil (66a) asymmetric with respect to said line of intersection, a magnet assembly (68a), disposed opposite to said focusing coil, having magnetic poles opposite to plural winding portions of said focusing coil intersecting to the focusing direction with inverse magnetic poles with each other, and having magnetic poles opposite to plural winding portions of said tracking coil intersecting to the tracking direction with inverse magnetic poles with each other.

6. An objective lens driving apparatus in accordance with claim 5, wherein
   two coil assemblies are provided, and the focusing coil and the tracking coil of each coil assembly are symmetric to the optical axis objective lens.

7. An objective lens driving apparatus comprising:
   an objective lens (1) for focusing a light beam on a disc for recording and reproducing information on said disc;
   a lens holder (2) for holding said objective lens;
   a plurality of supporting member (3a–3d) for supporting said lens holder so as to be moveable in a focusing direction (Fo) of the optical axis direction of said objective lens, and in a tracking direction (Tk) of a radial direction of said disc;
   a coil assembly (54a) having a tracking coil (56a) formed so as to include a line of intersection of the plane of the focusing coil and the plane being perpendicular to the tracking direction (Tk) and including the optical axis of said objective lens as a centerline, and at least two focusing coils (55*a* and 55*b*) arranged on both sides of said tracking coil in the tracking direction on a plane containing the focusing direction and the tracking direction of said lens holder; and a magnet assembly (8*a*) having a first magnet (8*a*1) and a second magnet (8*a*2) disposed opposite to said at least two focusing coils and having two magnetic poles facing to winding portions of said focusing coil extending in a direction intersecting said focusing direction; wherein said first magnet and said second magnet are disposed adjacent to each other along a center line parallel to focusing direction of said tracking coil, and a magnetic pole of each magnet forming L-shaped region so that inverse two magnetic poles are disposed opposite to winding portions of said tracking coil extending in a direction intersecting said tracking direction.

8. An objective lens driving apparatus in accordance with claim 6 or 7, wherein at least two focusing coils of said coil assembly are supplied with currents of different directions and values to the respective focusing coils through respective current supply lines.

9. An objective lens driving apparatus in accordance with claim 1, 3, 5 or 7, wherein said focusing coil and tracking coil are arranged on at least one layer of the same substrate on a plane including focusing direction and tracking direction of said lens holder.

10. An objective lens driving apparatus in accordance with claim 1, 3, 5 or 7, wherein said magnet assembly is configured of an integration of single-pole magnetized magnets each having the N pole on one side thereof and the S pole on the other side.

11. An objective lens driving apparatus in accordance with claim 1, 3, 5 or 7, wherein said magnet assembly is configured of an integration of two-pole magnetized magnets each having the N pole in a portion of one side thereof and the S pole in another portion of the same side.

12. An objective lens driving apparatus in accordance with claim 1, 3, 5 or 7, wherein said magnet assembly is a multi-pole magnetized magnet having at least two N poles and two S poles on one side.

* * * * *

UNITED STATES PATENT AND TRADEMARK OFFICE
CERTIFICATE OF CORRECTION

PATENT NO.    : 6,587,284 B2
DATED         : July 1, 2003
INVENTOR(S)   : Takeo Santo et al.

It is certified that error appears in the above-identified patent and that said Letters Patent is hereby corrected as shown below:

Title page,
Item [63], Related U.S. Application Data, please delete "Continuation", and insert therefor -- Continuation-In-Part --.

Column 1,
Line 3, please delete "Continuation", and insert therefor -- Continuation-In-Part --.

Column 15,
Line 48, before the sentence beginning "The magnet 68a1 is formed...", please insert therefor -- The magnet 68a includes two magnets 68a1 and 68a2. --.

Column 16,
Line 4, please delete "Current", and insert therefor -- Currents --.

Column 17,
Line 24, Line 4, please delete "currents", and insert therefor -- current --.

Signed and Sealed this

Sixth Day of April, 2004

JON W. DUDAS
*Acting Director of the United States Patent and Trademark Office*